(12) United States Patent
Ruokangas et al.

(10) Patent No.: US 7,081,834 B2
(45) Date of Patent: Jul. 25, 2006

(54) AVIATION WEATHER AWARENESS AND REPORTING ENHANCEMENTS (AWARE) SYSTEM USING A TEMPORAL-SPATIAL WEATHER DATABASE AND A BAYESIAN NETWORK MODEL

(75) Inventors: Corinne C. Ruokangas, Woodside, CA (US); Ole J. Mengshoel, Newport Beach, CA (US); Serdar Uckun, Palo Alto, CA (US); Timothy W. Rand, Cedar Rapids, IA (US); Patrick Donohue, Chapel Hill, NC (US); Selim Tuvi, San Francisco, CA (US)

(73) Assignee: Rockwell Scientific Licensing LLC, Thousand Oaks, CA (US)

( * ) Notice: Subject to any disclaimer, the term of this patent is extended or adjusted under 35 U.S.C. 154(b) by 727 days.

(21) Appl. No.: 10/393,886

(22) Filed: Mar. 21, 2003

(65) Prior Publication Data
US 2004/0183695 A1 Sep. 23, 2004

(51) Int. Cl.
*G08B 21/00* (2006.01)
(52) U.S. Cl. .................... 340/945; 340/601; 340/905; 340/962; 340/968; 340/971; 702/3; 707/10
(58) Field of Classification Search ............. None
See application file for complete search history.

(56) References Cited

U.S. PATENT DOCUMENTS

| | | | |
|---|---|---|---|
| 5,276,326 A * | 1/1994 | Philpott | 250/334 |
| 5,281,815 A * | 1/1994 | Even-Tov | 250/339.04 |
| 6,449,603 B1 * | 9/2002 | Hunter | 706/15 |
| 6,842,122 B1 * | 1/2005 | Langner et al. | 340/945 |
| 6,937,776 B1 * | 8/2005 | Li et al. | 382/260 |
| 6,975,925 B1 * | 12/2005 | Barnes et al. | 700/286 |
| 2003/0028469 A1 * | 2/2003 | Bergman et al. | 705/37 |
| 2003/0053658 A1 * | 3/2003 | Pavlidis | 382/103 |
| 2003/0065409 A1 * | 4/2003 | Raeth et al. | 700/31 |
| 2004/0032973 A1 * | 2/2004 | Robeson et al. | 382/110 |
| 2004/0068496 A1 * | 4/2004 | Bergman et al. | 707/4 |
| 2004/0162648 A1 * | 8/2004 | Bontrager et al. | 701/3 |

\* cited by examiner

*Primary Examiner*—Benjamin C. Lee
(74) *Attorney, Agent, or Firm*—Eric Gifford; John J. Deinken; David J. Zoetewey

(57) ABSTRACT

An Aviation Weather Awareness and Reporting Enhancements (AWARE) system provides situational awareness by effectively filtering, analyzing and visualizing aviation weather data and specific hazard alerts in preflight, in-cockpit and controller applications. The AWARE system includes a temporal-spatial databases that filters weather data and a Bayesian network that assesses specific hazards in the filtered weather data in the context of pilot preferences, aircraft properties and airport properties. The filtered weather data and hazard alerts are then displayed on a client.

67 Claims, 26 Drawing Sheets

| SIGMET Id | Valid From | Valid To | Hail | RawData |
|---|---|---|---|---|
| 35847 | 10/29/2002 1:55:00 AM | 10/29/2002 3:55:00 AM | 0 | <CLOB>... |
| 35849 | 10/29/2002 8:55:00 AM | 10/29/2002 10:55:00 AM | 0 | <CLOB>... |
| 35850 | 10/29/2002 9:55:00 AM | 10/29/2002 11:55:00 AM | 0 | <CLOB>... |

| LastName | Certificate | Instrument Rating | Crosswind Max | Wind Speed Max | Min Storm Dist | Turb Tolerance |
|---|---|---|---|---|---|---|
| Yeager | 2 | 1 | 26 | 20 | 10 | 2 |
| Dole | 4 | 1 | 26 | 26 | 10 | 4 |

| | VFR Ceil Min | VFR Vis | IFR P Ceil Min | IFR Vis | Gust Max | HeadWind Max | TailWind Max |
|---|---|---|---|---|---|---|---|
| Yeager | 1000 | 3 | 600 | 3 | 50 | 35 | 10 |
| Dole | 1000 | 3 | 650 | 10 | 50 | 35 | 10 |

| Company | Cruise Speed | Usable Fuel Cap | Takeoff Dist Obs | Landing Dist Obs |
|---|---|---|---|---|
| Cessna 172S Skyhawk SP | 122 | 53 | 1630 | 1335 |
| Cirrus Design SR20 | 160 | 45 | 1400 | 1500 |
| New Piper Aircraft Archer III | 128 | 48 | 1610 | 1400 |
| American Champion Citabria Aurora 7ECA | 100 | 35 | 890 | 775 |
| Maule Air M-7-420 Amphibian | 100 | 85 | 250 | 300 |
| New Piper Aircraft Seneca V | 200 | 122 | 1707 | 2196 |
| Beechcraft Super King Air B200 | 284 | 544 | 2579 | 2845 |
| Boeing 757-300 | 530 | 11466 | 4000 | 4000 |

FIG. 3c

| Flight_Point_ID | Runway_ID | Length | Width | Lighting | Surface |
|---|---|---|---|---|---|
| 1 | 15/33 | 3797 | 75 | MED | ASPH-G |
| 2 | 11/29 | 5000 | 100 | MED | ASPH-F |
| 3 | 05/23 | 7000 | 150 | HIGH | ASPH-G |
| 5 | 10/28 | 3987 | 75 | MED | ASPH-G |
| 5 | 18/36 | 3933 | 75 | MED | ASPH-F |
| 6 | 05/23 | 10000 | 150 | HIGH | ASPH-G |
| 6 | 18/36 | 7100 | 150 | MED | ASPH-G |
| 10 | 18/36 | 5096 | 100 | MED | ASPH-G |

FIG. 3d

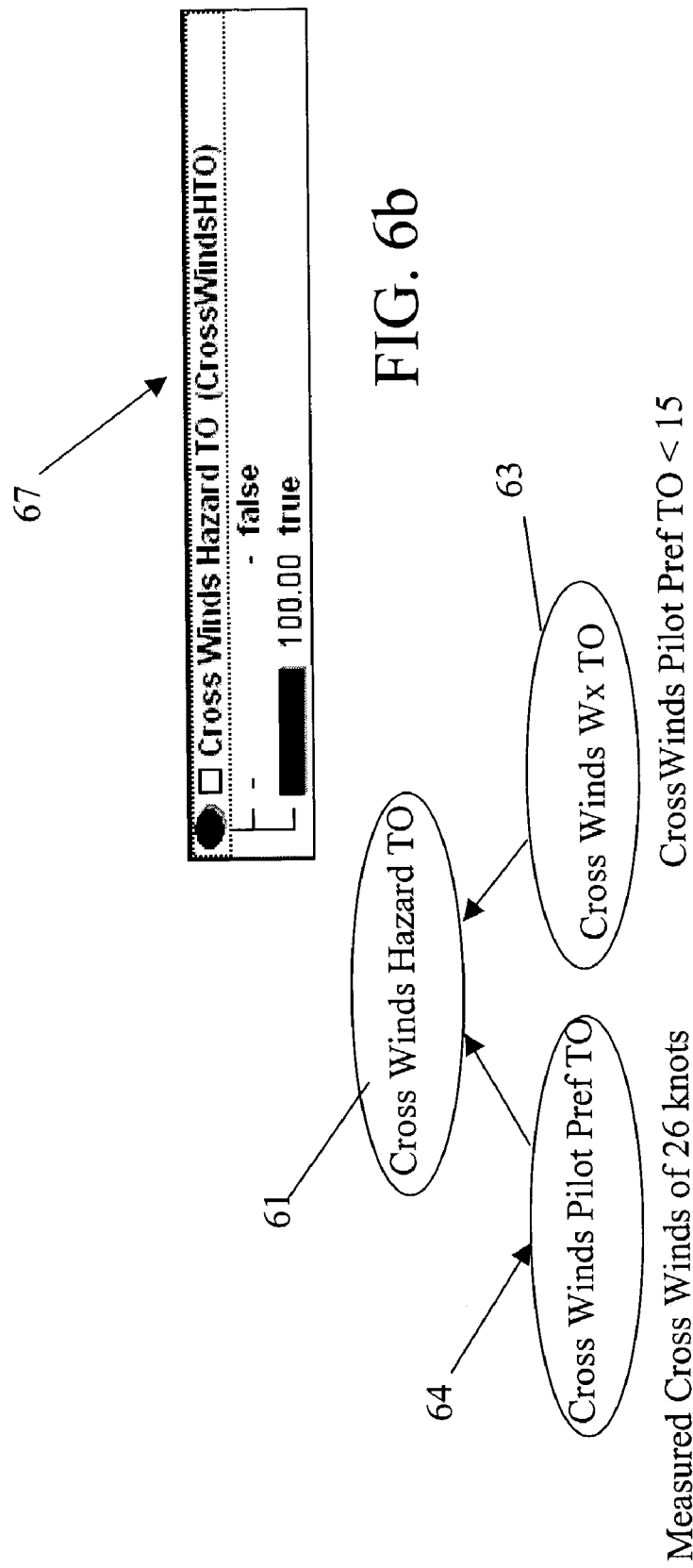

| Parent Node #1 | false | | | | true | | | |
|---|---|---|---|---|---|---|---|---|
| Parent Node #2 | false | | true | | false | | true | |
| Parent Node #3 | false | true | false | true | false | true | false | true |
| Hazard False | 0.9999 | 0.45 | 0.45 | 0.2 | 0.45 | 0.2 | 0.2 | 0.0001 |
| Hazard True | 0.0001 | 0.55 | 0.55 | 0.8 | 0.55 | 0.8 | 0.8 | 0.9999 |

69 = Parent Nodes rows; 70 = Hazard rows; 68 → highlighted cell

Hazard (DepartClimbH)
  34.21  No Hazard Identified
  65.79  Hazard Identified

| Pilot | Mode | Vis LIFR / Vis VFR / Vis IFR | Ceil LIFR / Ceil VFR / Ceil IFR | Fuel Reserve LIFR / Fuel Reserve VFR / Fuel Reserve IFR | | Xwinds | | Winds | TailWind | Turb |
|---|---|---|---|---|---|---|---|---|---|---|
| Dole | GA-IFR | 10 SM | 700' | 45 | | 26 | | 25 | 10 | 4 |
| | | | | Calc enroute fuel | | Calc enroute vis | | | | |
| | | | | T | | T | | | | |
| | | | | FlightPath | | TimeFrame | | | | |
| | | | | FP_SW_PHXTUSSJC | 10/021/02 23:22Z | | | | | |

68

| Gust Winds Hazard | FALSE | | | | TRUE | | | |
|---|---|---|---|---|---|---|---|---|
| General Winds Hazard | FALSE | | TRUE | | FALSE | | TRUE | |
| Cross Winds Hazard | FALSE | TRUE | FALSE | TRUE | FALSE | TRUE | FALSE | TRUE |
| winds okay | 0.9999 | 0.1 | 0.2 | 9.9990E-05 | 0.2 | 0.1 | 0.1 | 9.9990E-05 |
| winds not okay | 9.9990E-05 | 0.9 | 0.8 | 0.9999 | 0.8 | 0.9 | 0.9 | 0.9999 |
FIG. 11a
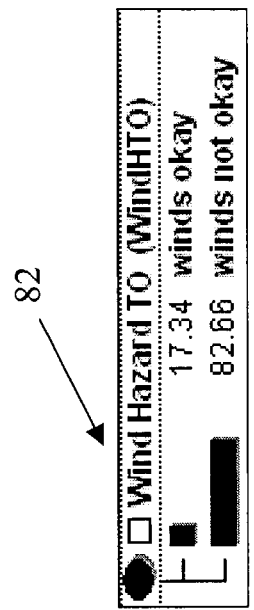
Using gust wind values
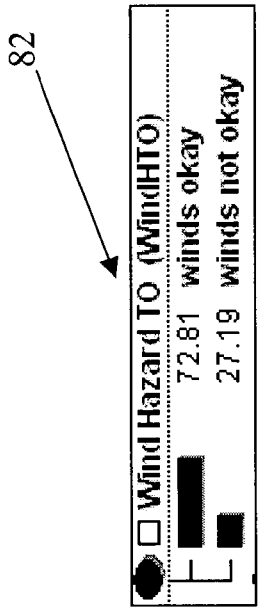
Using default values
FIG. 11b

| Flight | A | B | C | D |
|---|---|---|---|---|
| AWARE | All subjects found all hazards | All subjects found all hazards | All subjects found all hazards | All subjects found all hazards |
| DUAT | All subjects missed IFR airmet, found all other hazards | 1 found sigmet; others found all but sigmet | All found all hazards | 3 missed visibility due to IFR airmet |

| Pilot | Mode | Vis LIFR | Ceil LIFR | Fuel Reserve LIFR | Xwinds | Winds | TailWind | Turb |
|---|---|---|---|---|---|---|---|---|
| Witchey | LIFR | 100' | 1200' | 200 | 12 | 25 | 10 | 2 |
| | | | | Calc enroute fuel | Calc enroute vis | | | |
| | | | | F | F | | | |
| | | | | FlightPath | TimeFrame | | | |
| | | | | FP_DFW_RCM | 01/24/02 18:22Z | | | |

FIG. 16a

| Dispatcher | Mode | Vis LIFR | Ceil LIFR | Fuel Reserve LIFR | Xwinds | Winds | TailWind | Turb |
|---|---|---|---|---|---|---|---|---|
| Horton | Dispatcher | 100' | 1200' | 200 | 12 | 25 | 10 | 2 |
| | | | | Cal enroute fuel | Calc enroute vis | | | |
| | | | | F | F | | | |
| | | | | FlightPaths | TimeFrame | | | |
| | | | | FP_ORD_RIC | 06/24/02 18:22Z | | | |
| | | | | FP_RIC_ORD | 06/24/02 16:02Z | | | |

FIG. 17a

AVIATION WEATHER AWARENESS AND
REPORTING ENHANCEMENTS (AWARE)
SYSTEM USING A TEMPORAL-SPATIAL
WEATHER DATABASE AND A BAYESIAN
NETWORK MODEL

BACKGROUND OF THE INVENTION

1. Field of the Invention

This invention relates to technologies for interpreting and presenting aviation weather information and more specifically to an Aviation Weather Awareness and Reporting Enhancements (AWARE) system using a Bayesian network and a Temporal-Spatial Weather Database.

2. Description of the Related Art

Weather is a complex, dynamic process with tremendous impact on aviation and a substantial contributor to many general aviation (GA) accidents. Fatal accident rates for GA pilots are much higher than those for commercial air transport (AT) pilots, and lack of weather awareness is a common cause of many GA accidents and incidents. In 1996, there were 1.51 fatal accidents per 100,000 flight hours for GA vs. 0.28 for AT operations in the U.S. Although weather awareness is not the sole culprit for the large disparity between the GA and AT accident rates, of the 11500 GA accidents between 1988 and 1992, over 3600 were attributable totally or in part to weather (National Transportation Safety Board statistics). Non-instrument-rated pilots inadvertently flying into instrument meteorological conditions cause a large percentage of fatal GA accidents. Instrument-rated pilots flying into catastrophic weather conditions such as thunderstorms and low-level wind shear also cause a number of fatal accidents.

During preflight, AT and GA pilots have access to large amounts of aviation weather data. However, it is difficult and time-consuming to identify weather hazards, due to the sheer amount, cryptic formatting, and lack of integration of the data. The pilots are required to review text-based weather data such as METARs, TAFs, FAs, pilot reports (PIREPs), SIGMETs, and AIRMETs from a service such as Direct User Access Terminal (DUAT), sectional maps and commercially available displays of NEXRAD (Next Generation Weather Radar) Imagery and to talk via telephone with a professional weather briefer. AT pilots have an additional source in the form of their dispatchers.

Consider the following icing and turbulence AIRMETs as an example of DUAT text data:

AIRMET ICE . . . WA OR CA
FROM TVL TO FAT TO BIH TO RNO TO TVL
LGT OCNL MOD RIME ICGIC BTN 070 FL200.
CONDS SPRDG SLOLY SEWD AND CONTG BYD 09Z THRU 15Z.
AIRMET TURB . . . WA OR CA ID
FROM EHF TO SMZ TO SBA TO VTU TO PMD TO EHF
OCNL MOD TURB BLW 120 DUE TO MOD WLY FLOW.
CONDS SPRDG EWD CONTG BYD 09Z THRU 15Z.

Certain DUAT providers do a reasonable (but typically not entirely accurate) job in translating such reports to plain English text. A plain English report of the same AIRMETs might have the following information:

AIRMET Icing—Washington, Oregon, California
From South Lake Tahoe to Fresno to Bishop to Reno to South Lake Tahoe
Light occasional moderate rime icing in clouds between 7000 ft. MSL and FL200 (20,000 ft.). Conditions spreading slowly southeastward and continuing beyond 9:00 Zulu (GMT) through 15:00 Zulu.
AIRMET Turbulence—Washington, Oregon, California, Idaho
From Bakersfield to Santa Maria to Santa Barbara to Ventura to Palmdale to Bakersfield
Occasional moderate turbulence below 12,000 ft. due to moderate westerly flow.
Conditions spreading eastward and continuing beyond 09:00 Zulu through 15:00 Zulu.

Consider also the following as an example of SIGMETs as another example of typical DUATs data:

MKCC WST 081855
CONVECTIVE SIGMET 87C
VALID UNTIL 2055Z
LA TX AND CSTL WTRS
FROM 40WSW MLU-20W LCH-60WSW LCH-100SSE IAH
LINE SEV TS 20 NM WIDE MOV FROM 22025KT. TOPS ABV FL450.
TORNADOES . . . HAIL TO 1 IN . . . WIND GUSTS TO 70 KT POSS.
CONVECTIVE SIGMET 88C
VALID UNTIL 2055Z
AR LA
FROM 50SSW ARG-30NW ELD-30SSW EIC
LINE EMBD TS 20 NM WIDE MOV FROM 22025KT. TOPS TO FL400.
OUTLOOK VALID 082055-090055
FROM LOU-40NE LOZ-GQO-MGM-30SSW CEW-120S LCH-90SE PSX-IAH-ACT-MLC-SGF-LOU
REF WW 786.
SFC LOW IS DEEPENING OVER SWRN LA IN RESPONSE TO UPR LOW LIFTING NEWD INTO SWRN TX. FNTL BDRY STRETCHES FM ERN GRTLKS
THRU CNTRL OH AND MID TN TO THE DVLPG LOW IN SWRN CRNR LA. AMS
IS VERY MOIST WITH SFC DWPNTS IN THE 70S FM SRN LA TO SRN AL
AND FL PNHDL. LINE OF STG/SVR TS EXPD TO CONT ALG THE FNT NEAR
THE SFC LOW AND CONT TO EXTD NWD INTO AR IN LOW LVL WRM
ADVCTN
ZONE. ADDTNL ACT EXPD IN THE WRM SECTOR EWD INTO SRN AL
AND FL
PNHDL WHERE SECONDARY LOW LVL JET IS AIDING DVLPMT. TS
ALSO
EXPD TO DVLP NEWD ALG THE FNT INTO ERN KY AND ERN TN.
HUDSON

Ten, twenty and even thirty pages or more of non-translated text of this type in its most cryptic form is not uncommon for preflight weather briefings. While the data is copious it does not necessarily provide situation awareness; indeed it may lead to pilot information overload, which again may lead to loss of situation awareness on the part of the pilot.

The situation is similar for image data such as NEXRAD. NEXRAD imagery is now available from NIDS (NEXRAD Information Dissemination Service) providers at 5-minute intervals and is a valuable resource for visualizing thunderstorms developing or active along a flight plan. However, the visual imagery information is not correlated or integrated with the textual information available to a pilot, not tailored to a particular flight plan, and not prioritized based on hazard analysis. Again, loss of situation awareness on part of the pilot may result.

Once airborne, GA and AT pilots are usually limited to sparse information available via voice links and whatever is visible out the windshield. AT pilots must rely on often overwhelmed dispatchers to provide accurate, relevant and timely weather information. There are some capabilities in AT to augment dispatcher updates with textual reports in-cockpit. However, the same problems of overload, cryptic presentation and lack of integration that often occur during preflight remain.

On the ground, commercial dispatchers and air traffic controllers (controllers) have a tremendous responsibility for managing multiple aircraft during takeoff, cruise and landing in all types of weather. They are similarly overwhelmed with DUAT and NEXRAD data.

The aviation industry has a critical need for a system that can effectively filter, analyze, integrate and visualize the copious amounts of raw weather data to convey the most relevant and critical information to pilot and controller during preflight and in-cockpit in a user friendly manner.

SUMMARY OF THE INVENTION

In view of the above problems, the present invention provides an Aviation Weather Awareness and Reporting Enhancements (AWARE) system that can effectively filter, analyze, integrate and visualize aviation weather data and specific hazard alerts in preflight, in-cockpit and controller applications, providing superior context/situational awareness.

The AWARE system includes a database, a server and a client. The AWARE database includes a temporal-spatial (T/S) database that stores weather data from existing sources of text and image data and a contextual-information database that stores pilot preferences, aircraft properties, airport properties and other relevant information. The server includes a text and graphics postprocessor (TGP) and a decision support system (DSS). The client includes a user interface, a server interface and a processing component.

In response to a user request, the server extracts temporally and spatially filtered weather data from the T/S database. The TGP integrates the data and specifies icon identifiers to critical weather events in the text. The DSS uses a Bayesian network to analyze the filtered weather data in the context of the pilot preferences, aircraft properties and airport properties to generate hazard alerts. The client displays the hazard alerts and hazard assessment information with the integrated text and graphic weather data.

The Bayesian network is defined as a tuple (V,E,P), where V is a set of nodes, E is a set of edges and P is a set of conditional probability distributions. The set of nodes V are organized in a tree structure in which evidence nodes are the parents to first tier hazard nodes, which are in turn the parents to second tier hazard nodes. The evidence nodes are instantiated with the filtered weather data and relevant preferences and properties from the contextual-information database. Marginal distributions are calculated over the hazard nodes to determine the state of the first tier hazard nodes, which in turn determine the state of the second tier hazard nodes. The state of the hazard nodes determines the hazard alerts displayed by the client.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 3a through 3d are tables of temporal-spatial weather data, pilot preference, aircraft properties and airport properties;

FIGS. 6a and 6b are an illustration of a hazard node that is directly tied to context nodes and its marginal distribution table;

FIGS. 11a and 11b are an illustration of specification of a Bayesian network hazard node CPT and an example marginal distribution (Wind Hazard TO) during the Depart/Climb leg;

FIGS. 16a and 16b are a table of typical wrapper parameters and an exemplary display for an In-Cockpit application; and FIGS. 17a and 17b are a table of typical wrapper parameters and an exemplary display for a Controller application.

DETAILED DESCRIPTION OF THE INVENTION

To address the problems of information overload, consistency, timeliness and lack of effective integration of aviation weather data, the present invention provides an Aviation Weather Awareness and Reporting Enhancements (AWARE) system that filters the aviation weather data, analyzes and integrates weather hazards and visualizes the data and the hazard alerts for both pilots and controllers. The displayed information is context sensitive, that is, personalized according to user preferences, aircraft and airport properties, relevant flight plan(s) and assessed hazard levels, while preserving access to more detailed hazard assessment information and raw weather data. To accomplish this, the AWARE system uses existing weather data sources and exploits the same temporal-spatial database, contextual-information database and Bayesian network model across preflight, in-cockpit and controller applications.

Figure 1:
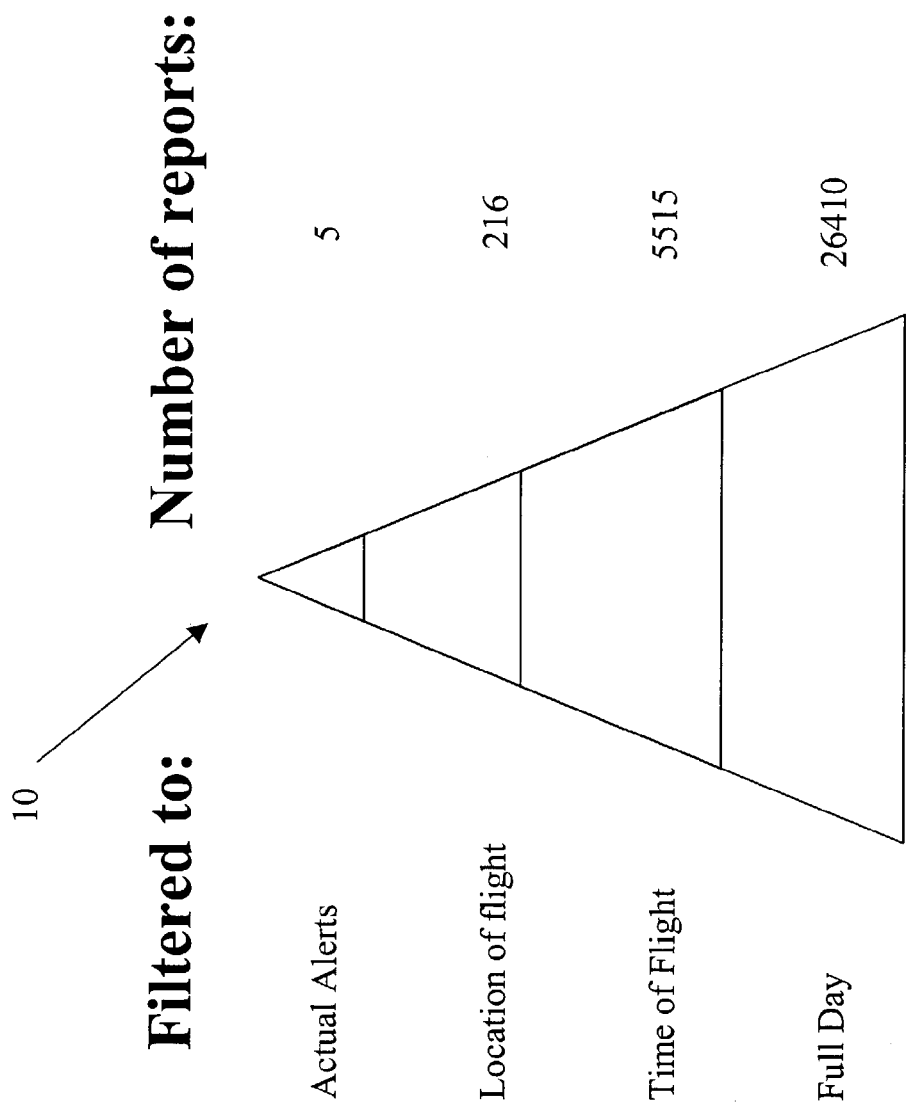
FIG. 1 is a weather data pyramid illustrating the concepts of information filtering, hazard analysis and visualization embodied in the present invention.

As illustrated in FIG. 1, a weather data pyramid 10 illustrates the concepts of information filtering, hazard analysis and visualization embodied in the present invention. The bottom of the weather pyramid, which represents weather data for an entire day, may, for example, contain over 25,000 different weather reports. This represents all of the information a pilot may receive and may be legally responsible for during a typical DUAT, sectional, and NEXRAD pre-flight presentation. By filtering the weather data in accordance with the time and location of a flight, the number of possible alerts is reduced by over two orders of magnitude to just over 200. Although a vast improvement, it is still not reasonable, safe or highly effective to require pilots or controllers to track so many potential hazards of varying reliability and probability during preflight much less in-cockpit.

The use of a Bayesian network based on weather parameters, interactions of weather parameters and pilot experience to further analyze the filtered weather data in the context of pilot preferences, aircraft and airport properties and the relevant flight plan(s) provides insight into impending hazards. The contextual Bayesian analysis reduces the number of "actual alerts" visualized to the user by over an order of magnitude to about 5. By means of drill-down capabilities, hazard assessment information and raw weather data underlying any alert remains available to the user through the AWARE client.

AWARE

Figure 2:
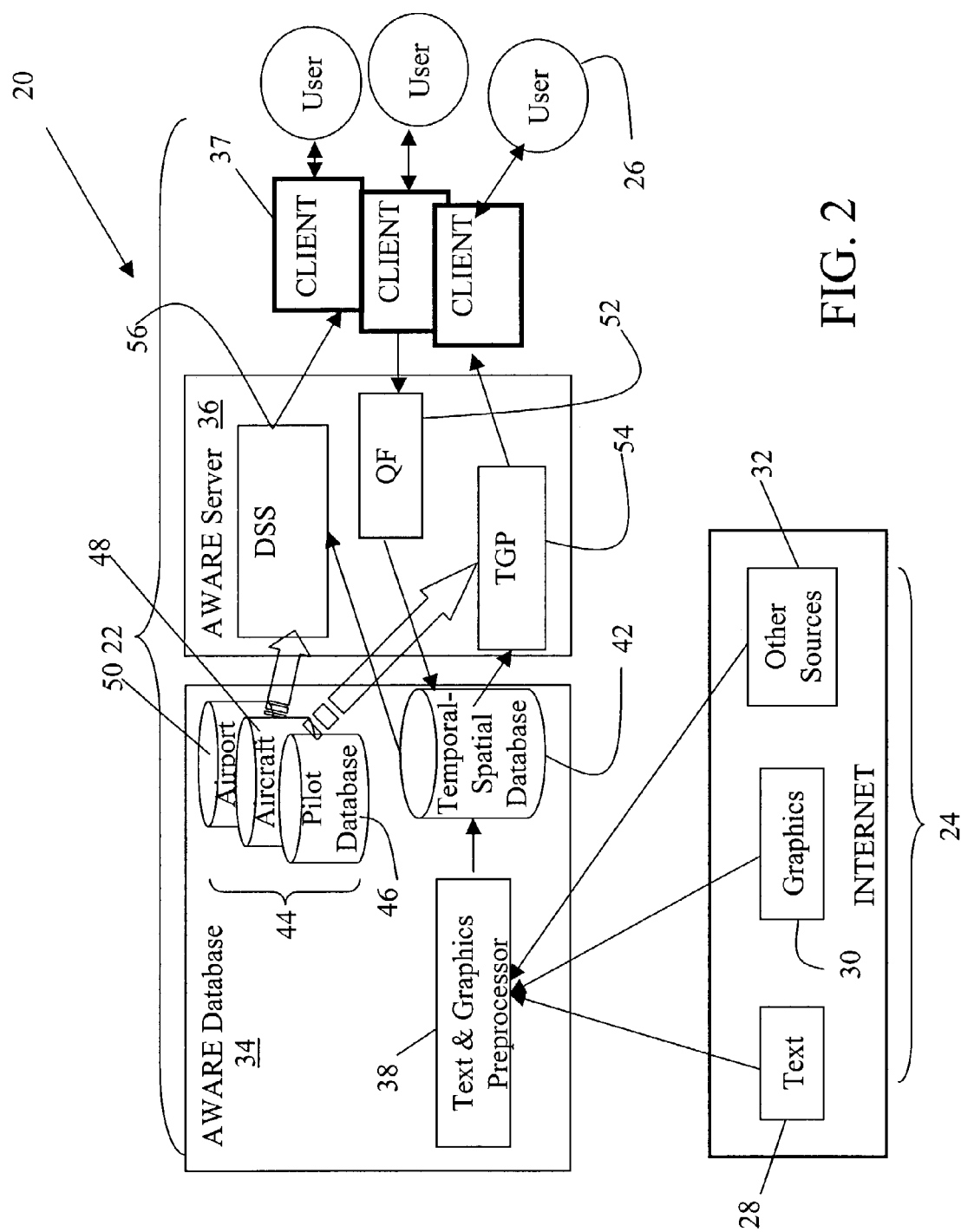
FIG. 2 is a block diagram of an AWARE system for aviation weather data in accordance with the present invention.

As shown in FIG. 2, an aviation weather data system 20 includes an AWARE system 22 that is built on top of existing weather data sources 24 to visualize contextually-filtered weather data and hazard alerts to one or more users (pilots or controllers) 26. Weather data sources 24 include certified sources or raw data including text based data sources 28 such as DUAT, image based data sources 30 such as NEXRAD, and non-certified sources 32 of processed experimental data such as turbulence, lightning, icing and satellite data. This data is broadcast over a communications network, e.g. the Internet or satellite, where it is available to the AWARE system 22.

AWARE system 22 includes an AWARE database 34, an AWARE server 36 and AWARE clients 37 (a user interface such as a GUI, a server interface and a processing component), which work together in response to a user request to contextually filter the available data, assess hazards and visualize the information to the user. AWARE database 34 includes a text and graphics preprocessor 38, which retrieves weather data from the various sources off of the Internet, via satellite, or from other data sources and preprocesses the data to include spatial and temporal identifiers. The data is then stored in a 4-dimensional temporal-spatial (T/S) database 42, as shown, for example, in FIG. 3a. As the data becomes outdated it is periodically purged from the database and archived for subsequent use.

AWARE database 34 also includes a contextual database 44 including, for example, a pilot preference database 46, an aircraft properties database 48 and an airport properties database 50. The pilot preferences, including experience and training, are suitably input once per pilot or controller, the aircraft properties once per aircraft, and the airport properties once per airport. These preferences and properties may be updated as needed. Contextual database 44 is accessed by AWARE server 36 to analyze the temporal/spatial weather data to generate hazard alerts and, in some cases, may be used to further tailor the text and graphics information that is visualized to the user by the client.

As shown in FIG. 3b, pilot preferences 46 include information about the pilot's qualifications, ratings, experience, and preference information such as minimum storm distance, minimum VFR ceiling, etc. As shown in FIG. 3c, aircraft properties 48 include information such as the make of aircraft, cruise speed, fuel capacity and takeoff and landing distances. As shown in FIG. 3d, airport properties 50 include runway identification, length, width, lighting conditions and surface. Analysis of current weather data for the pilot's flight path, available from the T/S database, taken in the context of the pilot, aircraft and airport information is critical to determining what alerts a pilot wants and needs to see and integrating the alerts with the underlying text and graphics data.

AWARE server 36 includes a query formulator 52, a text and graphics postprocessor (TGP) 54 and a decision support system (DSS) 56. Users 26 generate requests via clients 37 to AWARE server 36 for weather aviation data. The form of the request will vary depending on whether the application is for preflight, in-cockpit or controllers but will include information such as the flight plan, current location and heading of the aircraft, takeoff/cruise/landing/waypoints, pilot identification, aircraft identification, etc. required to access the T/S and contextual databases. Query formulator (QF) 52 formulates a query and sends the query to T/S database 42, which in turn returns the filtered weather data to the AWARE server along with the query. This data is forwarded to both DSS 56 and TGP 54. Although very similar, the forwarded data may differ if, for example, the regions covered by the DSS and TGP are not the same. For example, the region covered by DSS 56 may be limited to regions fairly close to the pilot and the intended flight path whereas the data forwarded to TGP 54 may be buffered to cover a wider region.

TGP 54 processes the data to integrate text and graphics. AWARE server 36 then forwards the visualization data to the requesting client. The user may choose to visualize any combination of graphical weather objects, including NEXRAD, ceiling, visibility, winds, SIGMETs, AIRMETs and PIREPs in a graphics frame on client 37. Only a small fraction of the text data, even post temporal-spatial filtering, can be meaningfully displayed at any one time. The displayed portion can be selected on the basis of proximity or criticality to the aircraft or tied to a user input such as a "mouse over" or "mouse click" that selects a hazard alert(s). Further, TGP 54 specifies icon identifiers to important text data such as SIGMETs, thunderstorms, pilot reports, etc., which are registered to the graphic data and visualized by the client. The TGP may also incorporate preferences either by hard-coding default values or by accessing the contextual-information database to further filter or refine the data from T/S database 42.

DSS 56 receives the data queried from T/S database 42, extracts the relevant information from contextual database 38, performs a hazard assessment using a Bayesian network and forwards hazard alerts, if any, to the client based on their probability and, in certain configurations, severity and/or criticality. The hazard alerts are visualized to the user in an alert frame as yellow or red alert icons. The hazard assessment information is keyed to the icons and is made available to the client in an analysis frame on the display. As mentioned above, the raw text data in the text frame may be keyed to the alert icons as well.

AWARE system 22 presents an integrated, well-organized visual display to the user. The client includes options for NEXRAD images and associated DUAT text data plus hazard alerts and the hazard assessment information. By filtering the raw weather data by time, space and context, the AWARE client is able to reduce information overload and present the aviator or controller with the data he or she needs in a timely and clear manner.

Bayesian Network Model

The use of a Bayesian network to calculate the hazard alerts differentiates AWARE from other aviation safety systems. Bayesian networks (BNs) can be used to evaluate uncertain data, compute the marginal distribution over hazard nodes, and in more sophisticated settings where severity and/or criticality information is available, calculate the utility of impending hazards. A Bayesian network is formally defined as a tuple (V, E, P), where V is a set of nodes (random variables), E is a set of edges, and P is a set of conditional probability distributions. The sets of nodes and edges form a directed acyclic graph (DAG).

Each conditional probability distribution specifies, conditionally, the distribution over a node given its parent nodes in the DAG (V,E). Nodes without parent nodes are denoted root nodes, while nodes without children are denoted leaf nodes. Various computations can be made over a BN, including computation of the marginal distribution over a node. Based on computing marginal distributions over hazard nodes, using algorithms well known from the literature, the DSS determines the possible aviation weather hazards based on multiple weather sources, as constrained by pilot preferences, aircraft properties, and airport properties. To reduce the difficulty of modeling, knowledge of causal relationships among variables is used to determine the position and direction of the links. Informally, the strength (or weight) of the influences is quantified by conditional probabilities.

AWARE Bayesian Network

As shown in FIGS. 4 through 7, the AWARE Decision Support System is formed on a generic Bayesian network and computational algorithm of the type just described. A BN wrapper instantiates the BN with relevant weather source data and contextual information and executes the computational algorithm. The BN is suitably implemented using BN processing software that can compute marginal distributions. The generic BN model is based on commonality between the preflight, in-cockpit and controller applications and is instantiated with parameters, contextual information and source data for a particular application and user request. The Bayesian network is used to analyze the T/S weather data in light of the preference and property information in the contextual databases, determines which (if any) hazards exist, generates alerts, and passes the alerts to the client for display to the requesting user.

Figure 4:
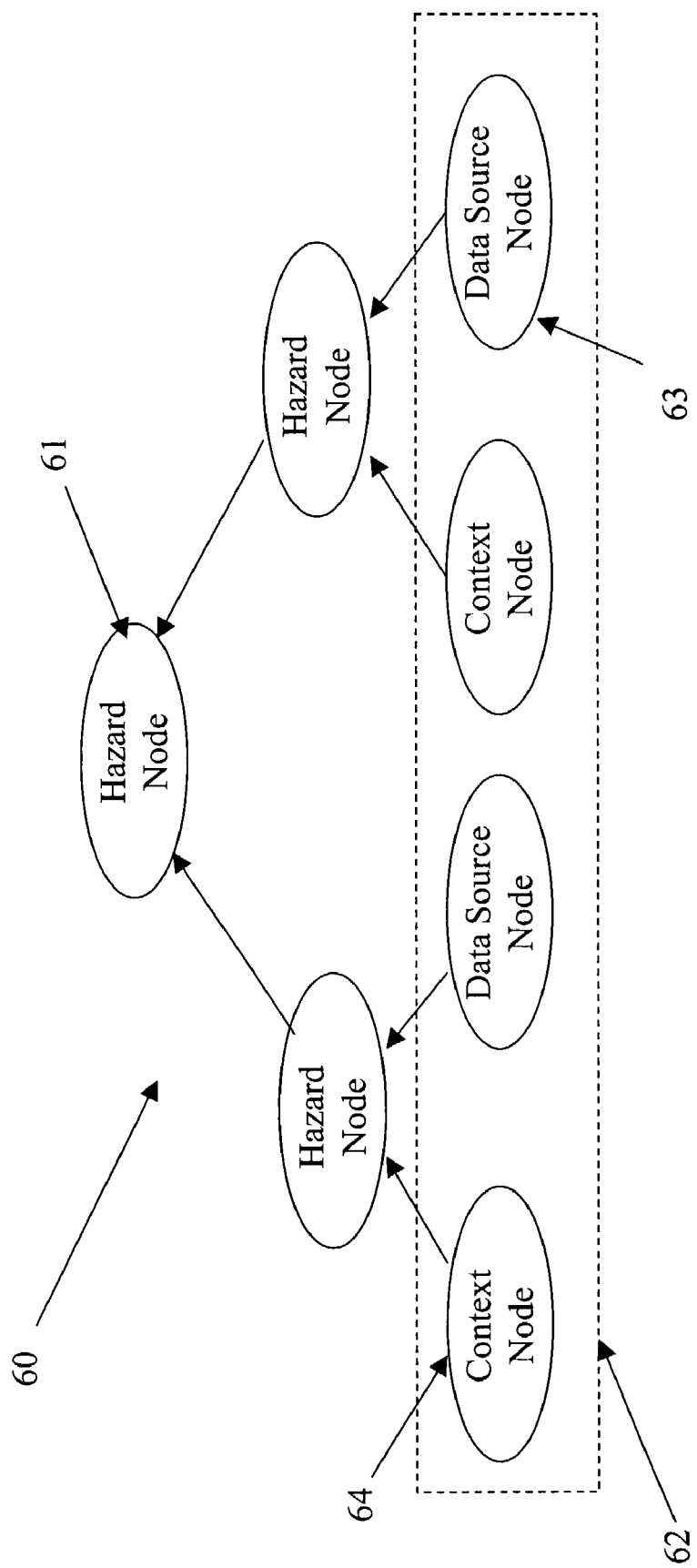
FIG. 4 is a simplified AWARE Bayesian network.

For purposes of illustration, a highly simplified AWARE Bayesian network 60 is shown in FIG. 4. The network is defined by its hazard nodes 61 and evidence nodes 62, which include weather data source nodes 63 and context nodes 64 (pilot preferences, aircraft and airport properties). Each hazard node 61 has a known conditional probability distribution that specifies, conditionally, the distribution over the node given its parent nodes in the DAG (V,E). Bayesian networks configured based on this model are complete, generic and flexible enough to support preflight, in-cockpit and controller applications.

Figure 5:
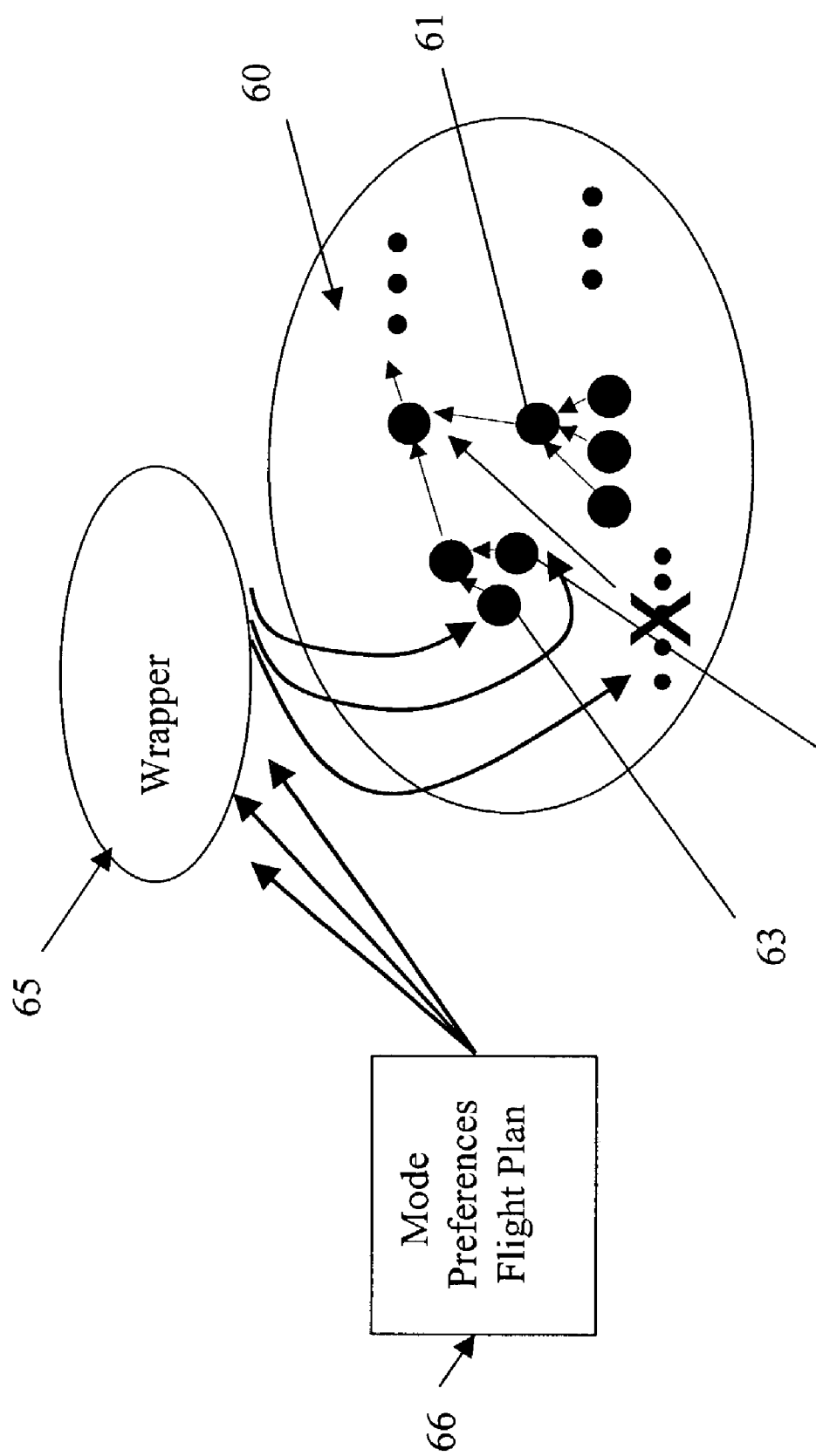
FIG. 5 is an illustration of a Bayesian network wrapper and the wrapping of a network to execute an application.

When executed by the DSS, the instantiation of the BN is determined by an application interface that "wraps" the model, as shown in FIG. 5. This BN wrapper 65 is responsible for determining the current mode of operation, extracting the relevant contextual information from the database, instantiating the evidence nodes with the filtered weather data and extracted contextual information and executing the BN's computational algorithm. More specifically, the user generates a request 66 including the mode (preflight, in-cockpit, controller), pilot identification, aircraft and flight plan. The client then causes the query formulator to issue corresponding queries that retrieve the filtered weather data. Wrapper 65 instantiate data source nodes 63 with the filtered weather data and retrieves the relevant contextual information to instantiate the pilot, aircraft and airport context nodes 64.

When executed by the wrapper, the BN computational algorithm evaluates the uncertain weather data and relevant contextual information by computing the marginal distributions, which can be done using different algorithms well known from the literature, over the hazard nodes as shown in FIGS. 6 and 7. As shown in FIGS. 6a and 6b, for hazard nodes 61 at the first tier of the Bayesian network, the parent nodes are evidence nodes including data source nodes 63 and/or context nodes 64. The nodes for weather data sources and contextual-information can be either deterministic or probabilistic in nature, which creates four distinct cases. A probabilistic data source would be used when actual weather data is not available. Similarly, if specific contextual-information is not provided a probabilistic distribution based on aggregate statistics can be used.

The case depicted in FIG. 6a is for a Cross Winds Hazard TO (takeoff) node 61 having a Cross Winds WX TO node 63 and a Cross Winds Pilot Pref TO node 64 as parents. In this particular case, the pilot has specified a preference of 15 knots maximum Cross Winds and the measured crosswind is 26 knots. The marginal distribution 67 for Cross Winds Hazard TO for "true hazard" is therefore 1 and for "no hazard" it is 0. The Bayesian network algorithm propagates the impact of this to the child node (Wind Hazard TO) and also propagates effects, if any, from elsewhere in the BN. The DSS then compares the marginal distribution of Wind Hazard TO node to a threshold and, given that the probability of a "true hazard" is 1, declares a Cross Winds Hazard alert.

Figures 7A, 7B:
FIGS. 7a and 7b are a hazard node conditional probability table (CPT) and an example marginal distribution table for the Bayesian network.

Additional hazard nodes might be added to the BN as children of data and context nodes in a manner similar to that just described, or as children of existing hazard nodes in the BN. FIG. 7a illustrates, for a hypothetical hazard node, a CPT 68 with states 70, parent nodes 69, and a marginal distribution computation 71. The DSS then compares the marginal distribution 71 to one or more thresholds and declares a hazard alert of a certain type if the marginal distribution exceeds a certain threshold. Several threshold levels may be used. For instance, one might have two threshold levels "yellow threshold level" L1 and "red threshold level" L2. If the probability exceeds a minimum threshold L1 a yellow alert is declared. If the probability exceeds a higher threshold L2 a red alert is declared.

This process is repeated for all hazard nodes in each successive layer of the network until the top leaf node is reached. The occurrence of a new user request will restart the process and generate new alerts. For the in-cockpit or controller applications, new user requests may be automatically generated to provide real-time hazard alerts to the pilot or controller.

Utilities

As so far described, the AWARE DSS uses a Bayesian network which relies on only the probability of whether a hazard node's marginal distribution indicates "Hazard identified" or "No hazard identified" to determine whether to declare an alert and, if so, what type of alert to declare. The Bayesian network can also be augmented to consider the severity of a hazard and the relative criticality of a particular hazard. Severity is, in our case, a measure of the difference between the preference or property and the source data, hence only directly applies to the hazard nodes at the lowest level of the network. Criticality is a measure of the relative importance of the different hazards and hazard alerts.

The Bayesian network may be augmented with criticality information by assigning a positive utility (weight) indicating the degree of negative consequence of the "Hazard identified" state of hazard nodes. A larger weight indicates a more critical (hazardous) consequence. The product of these criticality utility(s) and the marginal distributions of the hazard nodes can then be calculated, once the marginal distributions are known. The largest product indicates the most critical or hazardous alert.

In the manner described above, the more severe or more critical hazards would be more likely to be declared alerts and would have a greater visual impact on the display than they would based on a straight probabilistic calculation. In addition, and similar to probability thresholds, severity and criticality thresholds could be used to only display hazards above a certain level, and distinguish between levels of criticality or severity (for instance high, medium, low).

Depart/Climb Hazard Example

Let us now consider a specific example of a simple Bayesian network (with no severity or criticality information) involving Gust Winds Hazard during the Depart/Climb portion of a mission in a preflight application as illustrated in FIGS. 8 through 12.

Figure 8A:
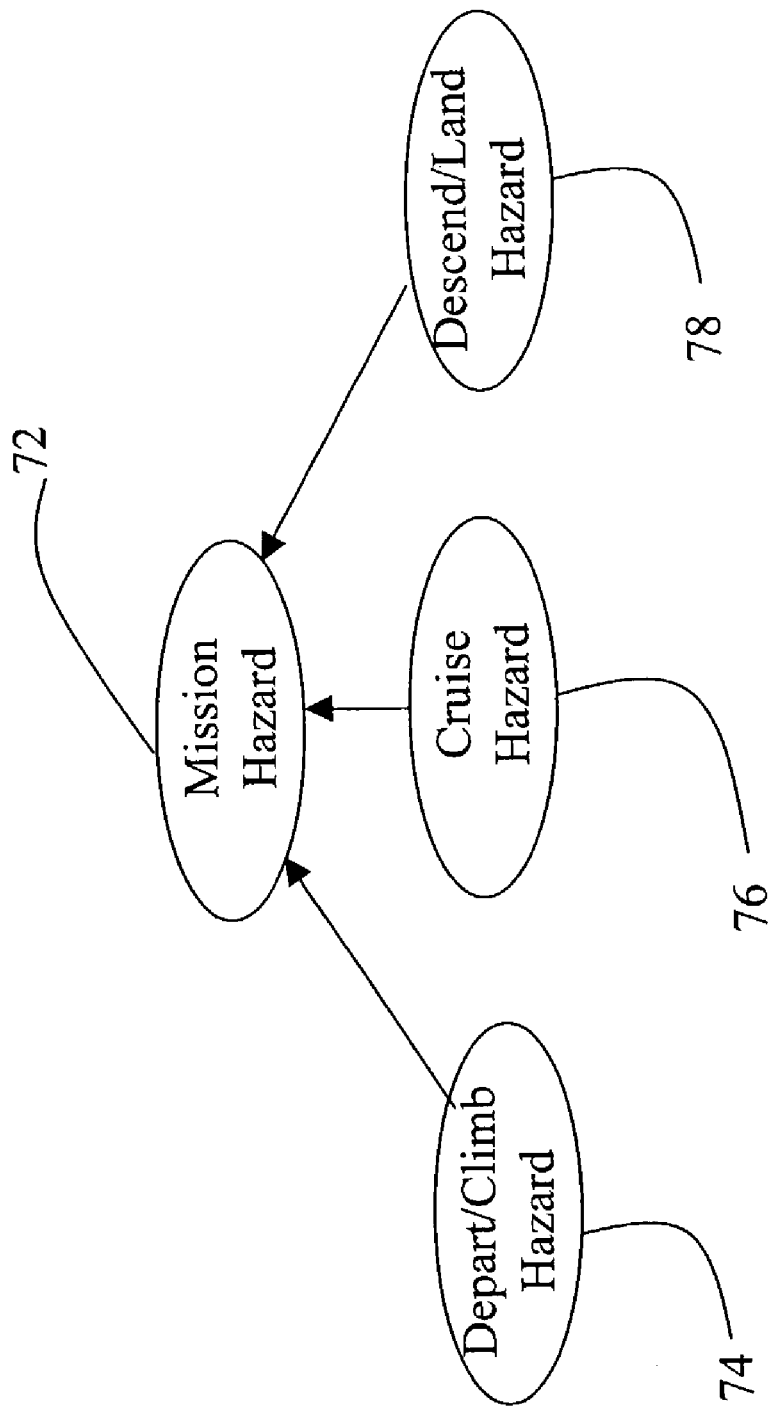
FIGS. 8a through 8d are illustrations of an AWARE Bayesian network for identifying mission hazards in aviation weather data.
Figure 8B:
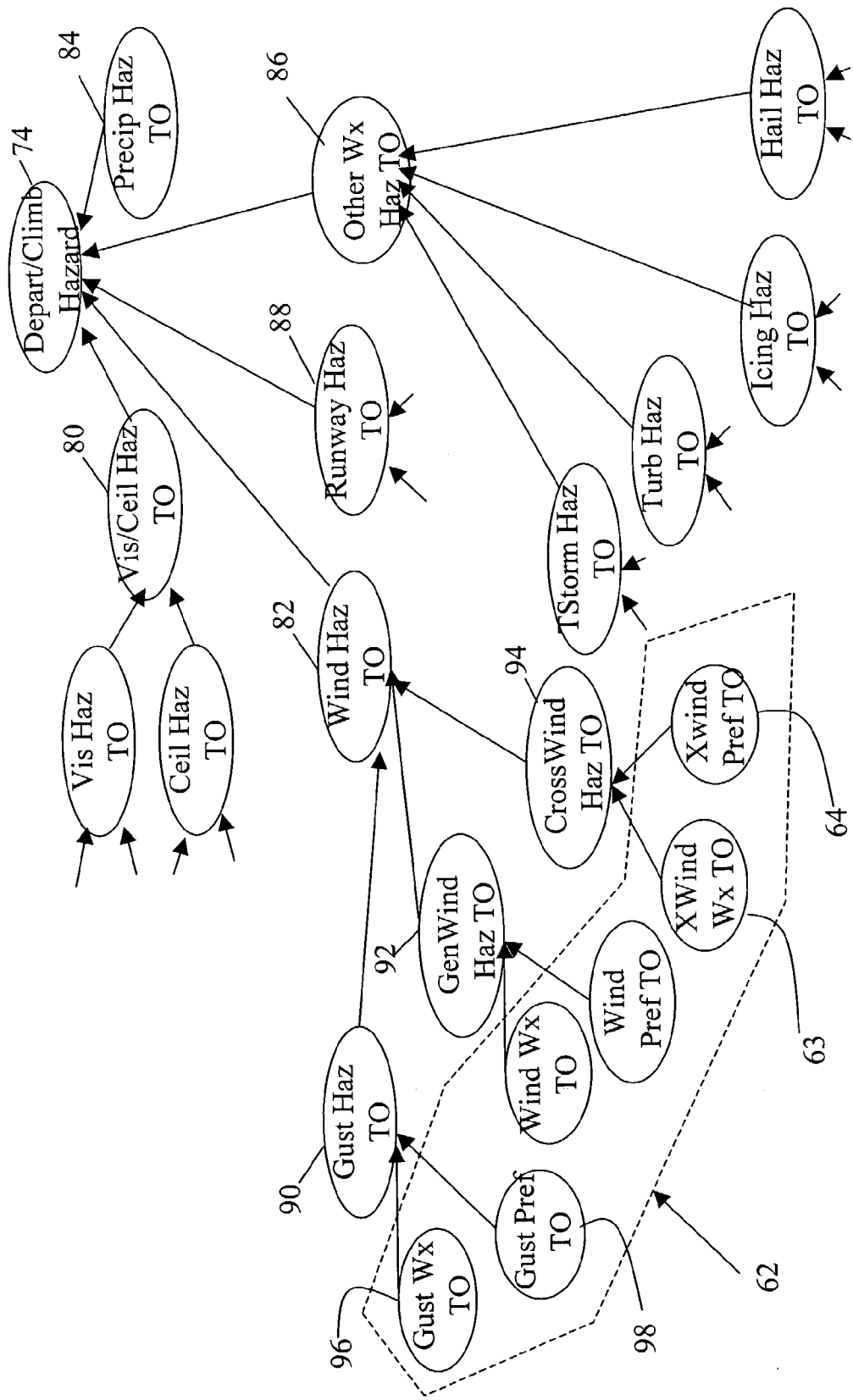
Figure 8C:
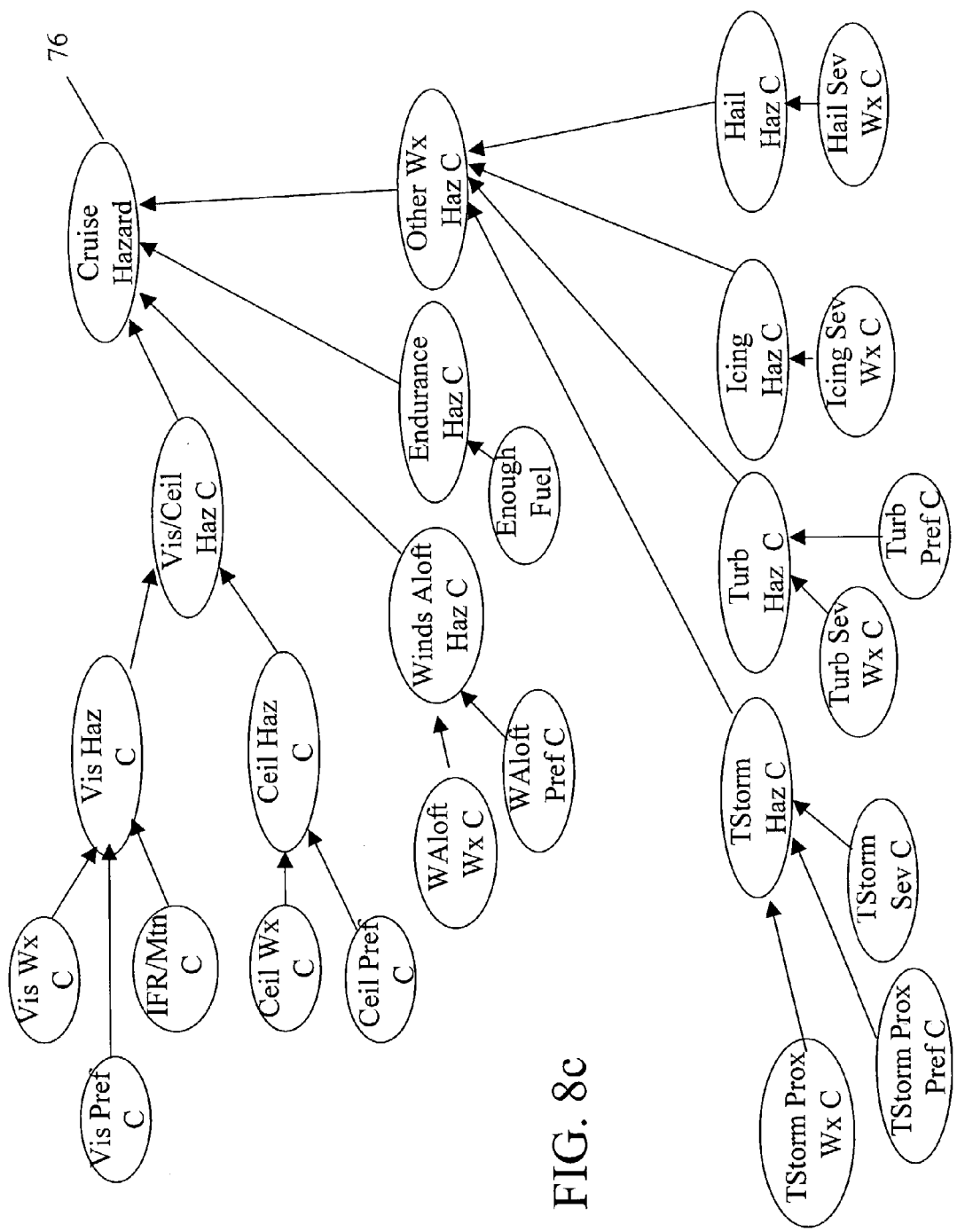
Figure 8D:
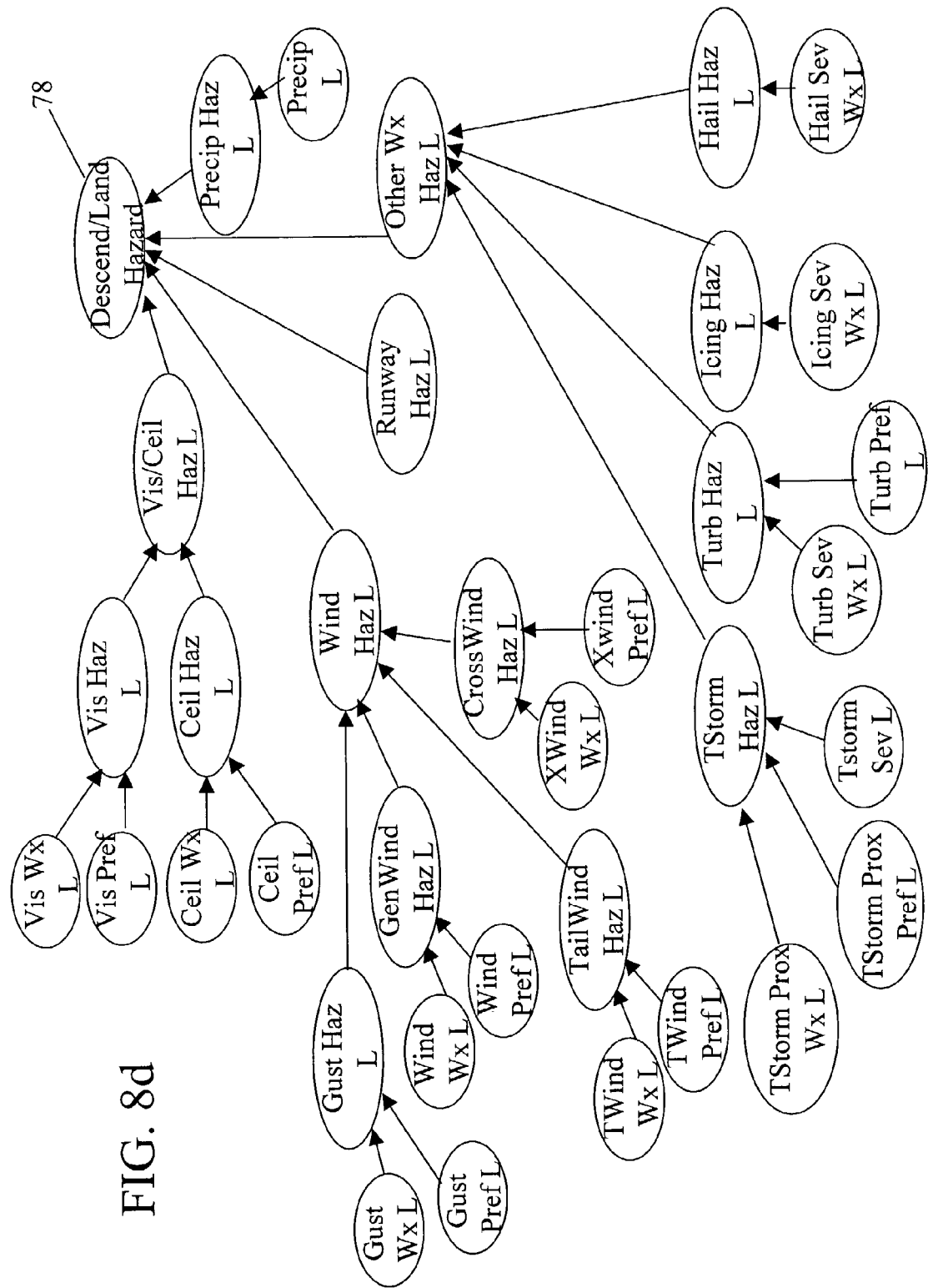

As shown in FIG. 8a, the top or leaf node in the Bayesian network is a Mission Hazard node 72. The network is then divided into Depart/Climb Hazard 74, Cruise Hazard 76 and a Descend/Land Hazard 78. This is a natural division based on the very different aspects and hazards associated with takeoff, cruise and landing although other divisions are possible. Each of these hazards is further sub-divided into more refined hazards, which are assessed in view of specific weather data and contextual information. For example, as shown in FIG. 8b Depart/Climb Hazard 74 branches to several hazards including Vis/Ceil Hazard TO (takeoff) 80, Wind Hazard TO 82, Precip Hazard TO 84, Other Overall Weather Hazard TO 86 and Runway Hazard TO 88. Wind Hazard TO 82 branches into Gust Winds Hazard TO 90, General Winds Hazard TO 92 and Cross Winds Hazard TO 94. The marginal distributions of these hazards are determined based on information available to input into the evidence nodes 62 including weather data source nodes 63 and context nodes 64.

Figure 9:
FIG. 9 is an example of a specific set of parameters for the wrapper.

As shown in FIG. 9, wrapper parameters 68 include the mode (preflight—"GA-IFR"), pilot (Dole), flight path pointer FR_SW_PHXTUSSJC, time frame Oct. 21, 2002 23:22Z and selected preferences including crosswinds (Xwinds) 26, winds 25, tail wind 10 and gusts 15 knots. The pilot can store a complete set of preferences in the database (as shown in FIG. 3b), which can be linked to the pilot's name in a request. The pilot may modify or override these default settings by specifying different values in the request. In addition, a pilot may have different preferences based on the type of aircraft. If a pilot does not provide preferences, AWARE can input default values for a corresponding pilot preference node or alternatively use prior aggregate distributions. The airport properties are keyed to the flight path and accessed from the database.

Figure 10A:
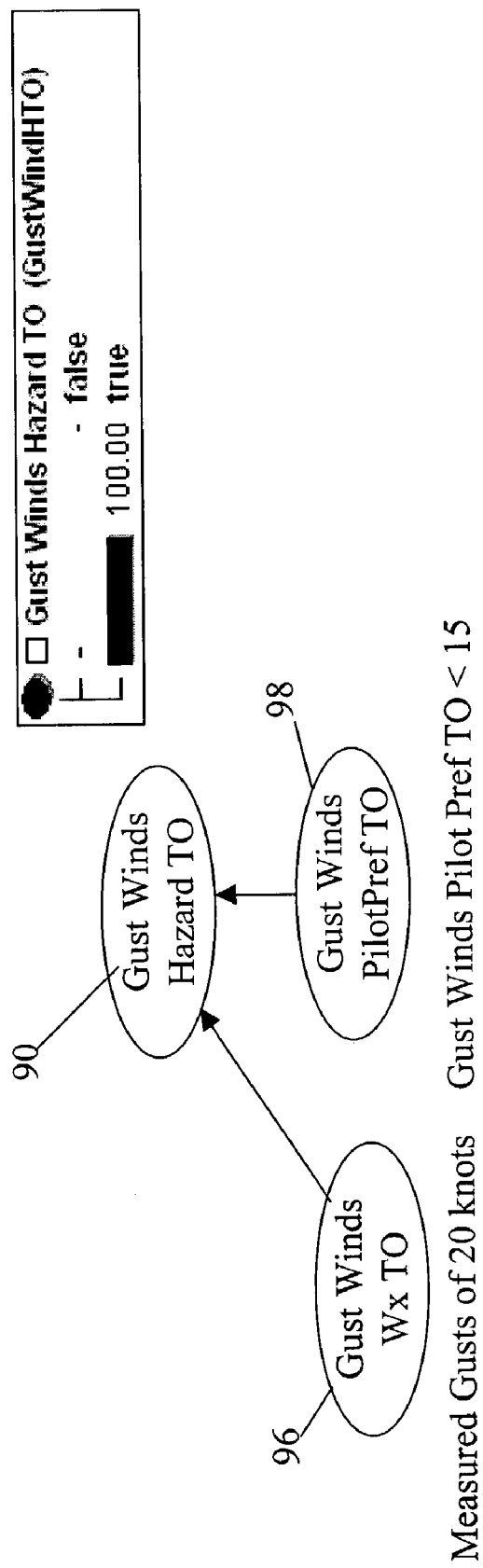
FIGS. 10a through 10d are illustrations of network computations over a low-level hazard node (Gust Winds Hazard TO) and its context nodes (Gust Winds Wx TO, Gust Winds Pilot Pref TO) for the Depart/Climb leg of a mission.
Figure 10B:
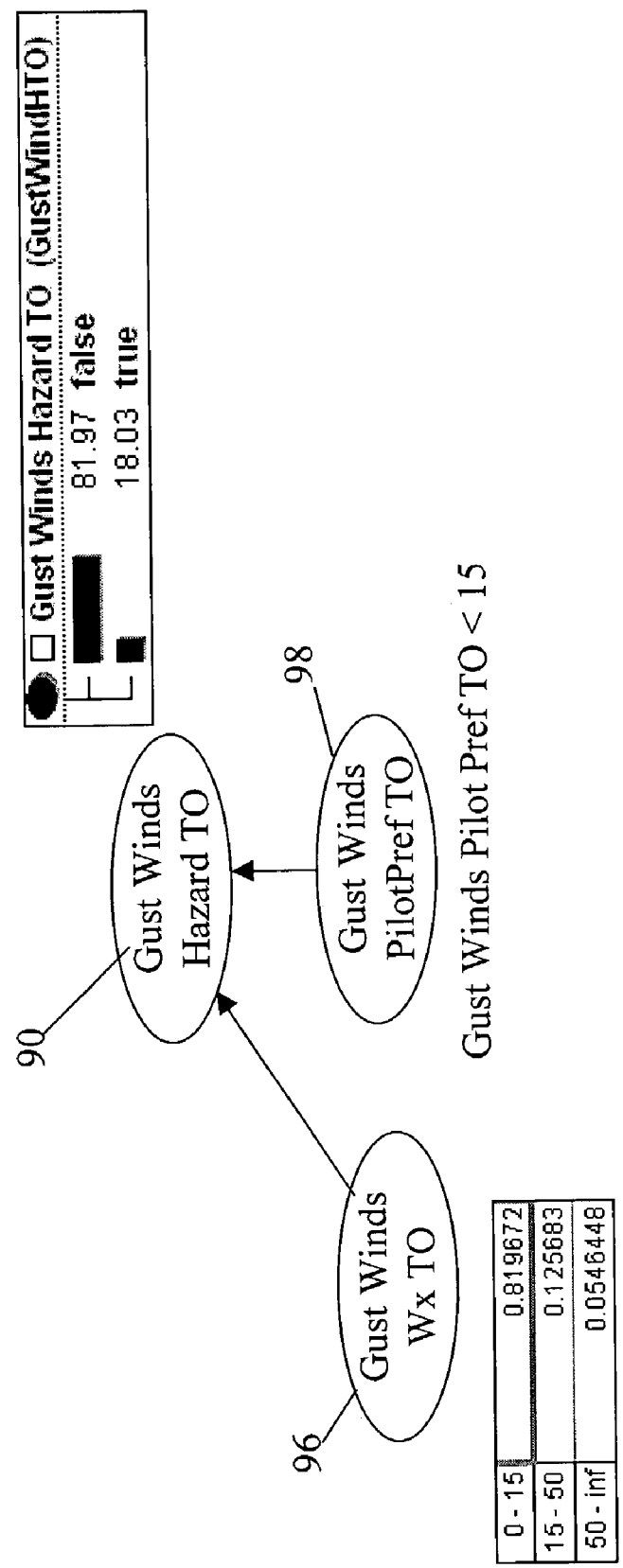

Once context nodes 64 are instantiated with the relevant contextual information and weather source data nodes 63 are instantiated with filtered weather data, the wrapper executes the BN computational algorithm to calculate the marginal distributions for the hazard nodes. As shown in FIGS. 10a and 10b, information from weather source node Gust Winds Wx TO 96 and preference node Gust Winds Pilot Pref TO 98 are combined, using the Bayesian network algorithm, in a probabilistic manner to compute the marginal distribution over the node Gust Winds Hazard TO 90. In the best case, actual weather data is combined with actual preferences of the user to determine whether the alert is true or false. If contextual information is not available for a specific parameter the default value is used. The default value can be simply a typical value or may be a probability distribution based on the preferences of a number of users. In some cases, measured weather data is not available and probabilistic data is used.

As shown in FIG. 10a, the Gust Winds Pilot Pref TO is 15 knots and the measured Gust Winds Wx TO is 20 knots. Thus, the probability of a "true" hazard is 100% and "false" is 0%.

As shown in FIG. 10b, the Gust Winds Pilot Pref TO is 15 knots but measured Gust Winds Wx data is not available. In this case, probabilistic Gust Winds data is needed in the form of a prior distribution over the "Gust Winds Wx TO" node 96. This prior distribution indicates that approximately 82% of the time wind gusts are less than 15 knots. As a result, the probability of hazard ("true") is only 18% and no hazard ("false") is 82%. When positive alerts are based on probabilistic rather than measured weather data the pilot is notified.

Figure 10C:
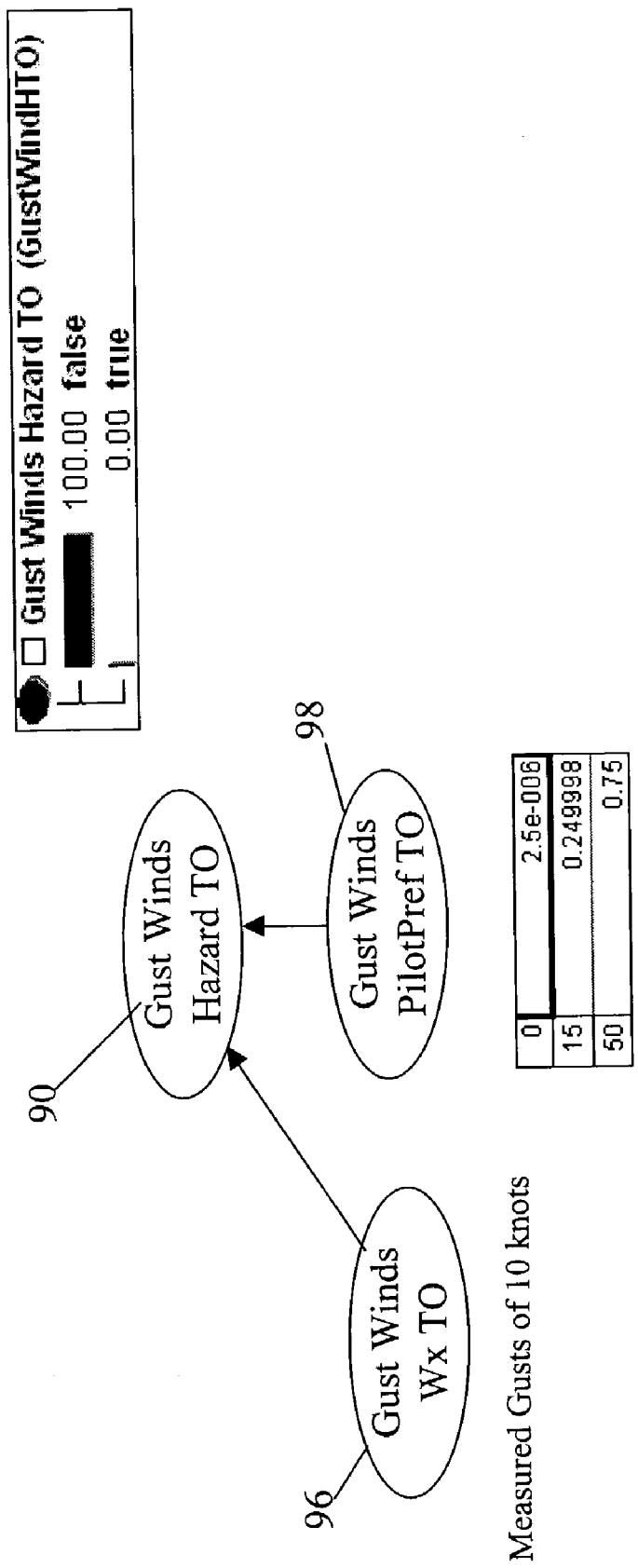

As shown in FIG. 10c, the measured Gust Winds Wx TO is 10 knots but the Gust Winds Pilot Pref TO is unspecified. If a simple default value, e.g. 15 knots is used, this case is the same as that shown in FIG. 10a. However, if a probabilistic Gust Winds Pilot Pref TO were used based on the aggregate preferences of a number of pilots, the probabilities of an alert true and alert false would be for example, 0% and 100%, respectively.

Figure 10D:
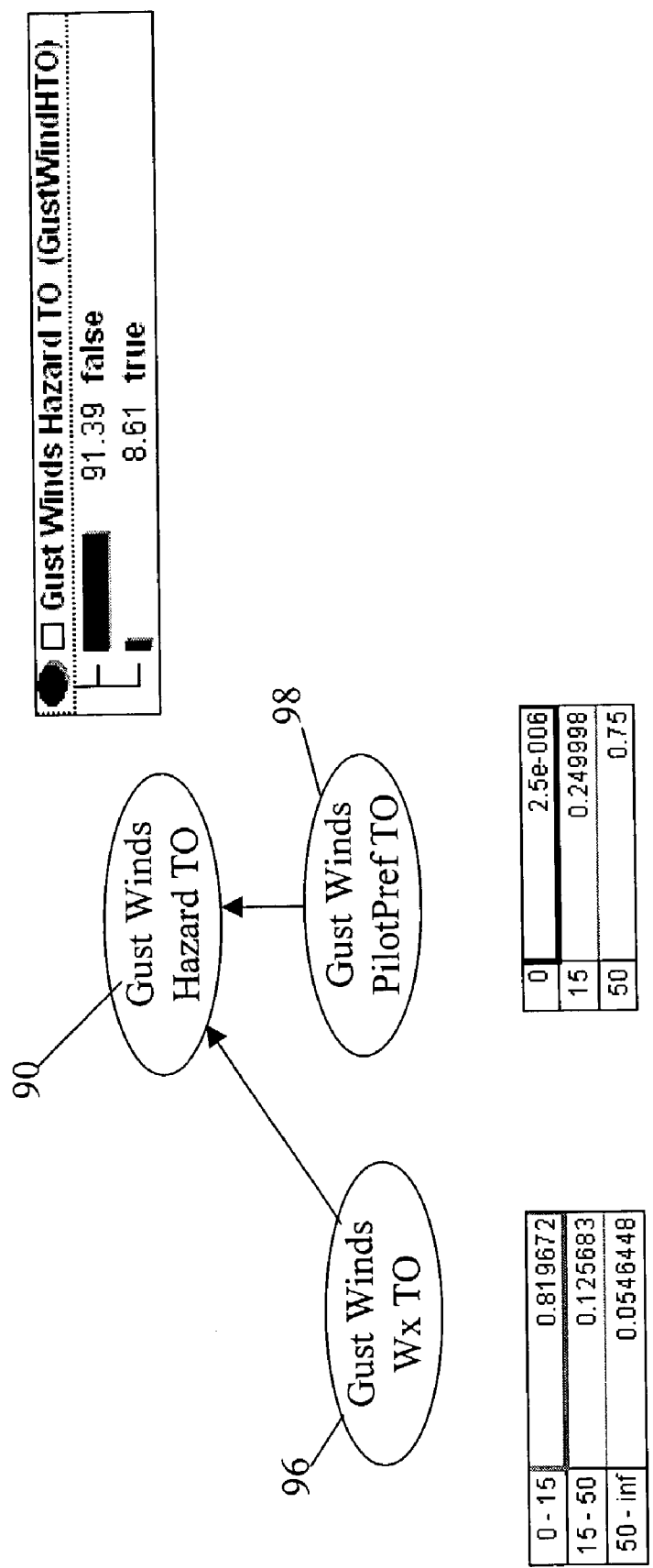

As shown in FIG. 10d, both the Gust Winds Wx TO and the Gust winds Pilot Pref TO are unavailable. In this case, the probabilistic distributions are used for both nodes. The probability of hazard "true" and hazard "false" are, for example, 9% and 91%, respectively.

The hazard status of a mid tier alert node such as Wind Hazard TO 82 or an upper tier hazard node such as Depart/Climb Hazard 74 is described by the node's marginal distribution (probability the hazard alert is "true" or "false"), which is used to declare a hazard alert. The conditional probabilities required to compute the marginal distributions are determined based on extensive pilot research and testing.

As shown in FIG. 11a, the status of Wind Hazard TO node 82 is determined by the marginal distributions of its parent nodes Gust Winds, General Winds and Cross Winds Hazard TO 90, 92, and 94. The conditional probability table (CPT)

100 has probability entries for Wind Hazard TO, both winds okay and winds not okay, for each of the eight possible cases produced by the true/false conditions of the parent nodes. For example, if Gust, General and Cross Winds are all true, the conditional probability of "winds not okay" is 0.9999. Conversely, if all the parent nodes are all false, the conditional probability of "winds not okay" is only 9.999e-05.

Calculating the probability distribution over all the cases gives the child node's marginal distribution. As shown in FIG. 11b, based on the BN and probabilistic input, the BN algorithm calculates 73% probability of "winds ok" but with actual measured data and specified contextual information as input calculates only a 17% probability of "winds ok". This result is thresholded to determine whether an alert should be generated and is passed to its child, Depart/Climb Hazard 74.

Figures 12A, 12B:
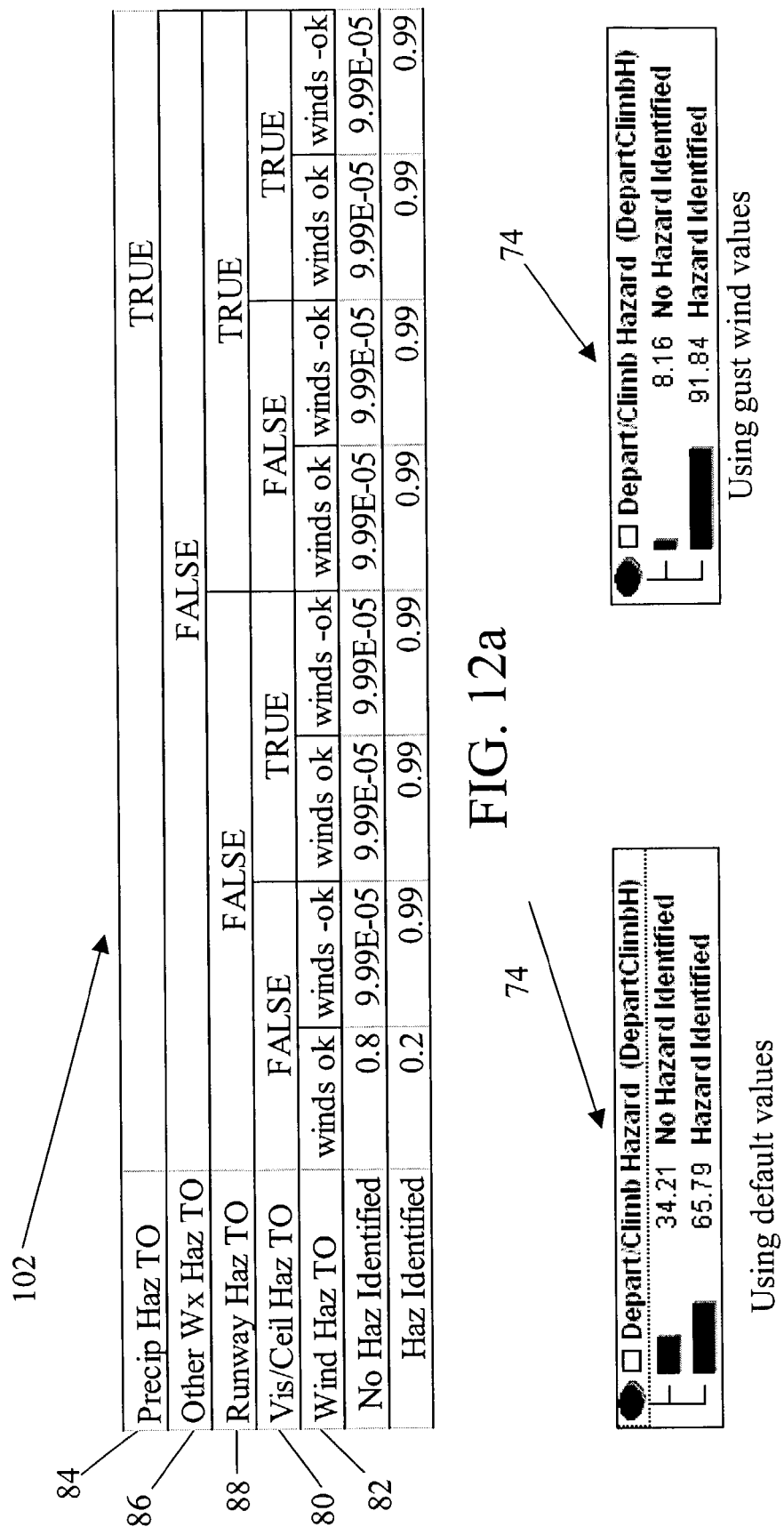
FIGS. 12a and 12b are an illustration of specification of a BN hazard node CPT and marginal distribution (Depart/Climb Hazard) during the Depart/Climb leg.

As shown in FIG. 12a, the status of Depart/Climb Hazard 74 is determined by the distributions of its parent nodes Precip Hazard TO 84, Other Overall Weather H 86, Runway Hazard TO 88, Vis/Ceil Hazard TO 80, and Wind Hazard TO 82. Conditional probability table 102 for the Depart/Climb Hazard has conditional probability entries for both "no hazard identified" and "hazard identified" for each of the thirty-two possible cases produced by the "true"/"false" conditions of its parent nodes. The calculation based on all the cases yields different marginal distributions as shown in FIG. 12b depending on whether probabilistic or actual weather data and contextual information is provided. This result is thresholded to determine whether an alert should be generated and is passed to its child, Mission Hazard 72.

AWARE Client

Integration and visualization of the graphics and text data and alerts are very important to the overall effectiveness of AWARE. In actual client displays, the use of color is critical to making an effective presentation. However, the figures as used herein to illustrate the AWARE client's graphical user interfaces are shown in black and white.

Figure 13:
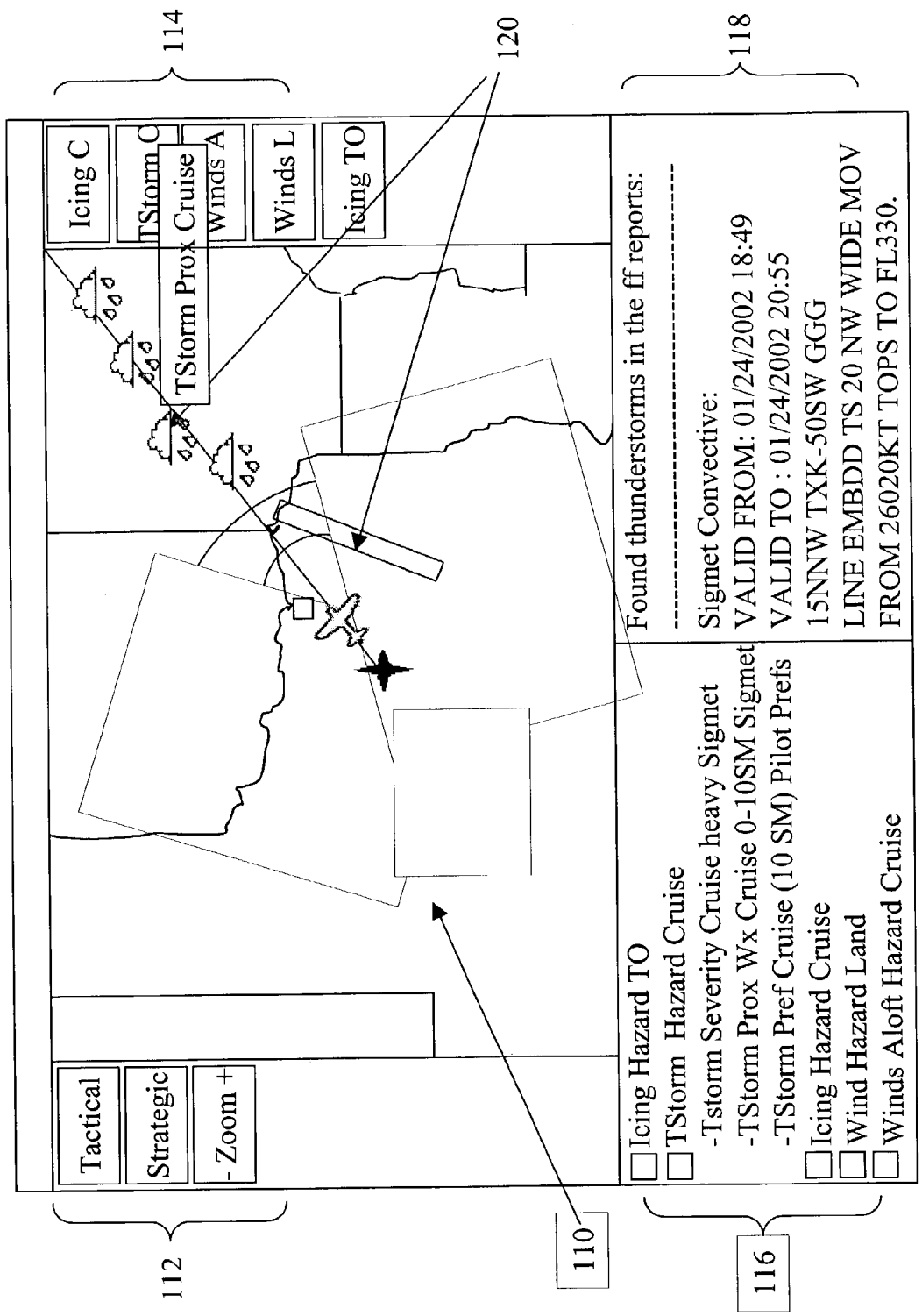
FIG. 13 is a typical display for visualizing aviation weather data overlaid with weather alerts generated by using the Bayesian network for hazard analysis.

As shown in FIG. 13, the client includes a display and graphic user interface. The visual display presented to the user generally has five different frames; graphics 110, mode control 112, alerts 114, hazard assessment information 116 and text 118. Graphics frame 110 includes, in an integrated fashion, (1) the filtered image and graphics data sources, e.g. NEXRAD imagery, provided by the T/S database in response to a query and (2) icon information 120 (SIGMETs, pilot reports, thunderstorms, etc.) generated by the TGP for the text data sources. Mode control frame 112 includes GUI buttons that allow the client to specify the application, zoom and other application specific functions. Alert frame 114 includes colored icons that display the alert designator, e.g. Wind Hazard TO, in the appropriate yellow or red color. Currently, during preflight every true alert is displayed hierarchically but in-cockpit only the lowest tier true alerts are displayed. During preflight the pilot has more time to analyze all alerts whereas in-cockpit the pilot wants to know only the specific hazard alerts. Hazard assessment information frame 116 includes the details of the analysis that generated the alerts. For example, the hazard assessment information frame may contain the marginal distribution, the state of its parent nodes, etc. The pilot accesses the detailed hazard assessment information by selecting an alert by clicking or mousing over the alert icon. The pilot can drill down into lower levels to reveal more specific details. Text frame 118 includes the formatted and filtered text source data that is keyed to the selected alert. Again, the pilot can drill down to access more specific details of the text data sources as needed.

The combination of using a T/S database to filter text and graphics data and a Bayesian net to generate specific hazard alerts with a graphical user interface that keys the provision of hazard assessment information and raw text data (formatted) to the selection of an alert provides a highly effective user interface for presenting aviation weather data for preflight, in-cockpit and controller applications.

Preflight

Figures 14A, 14B:
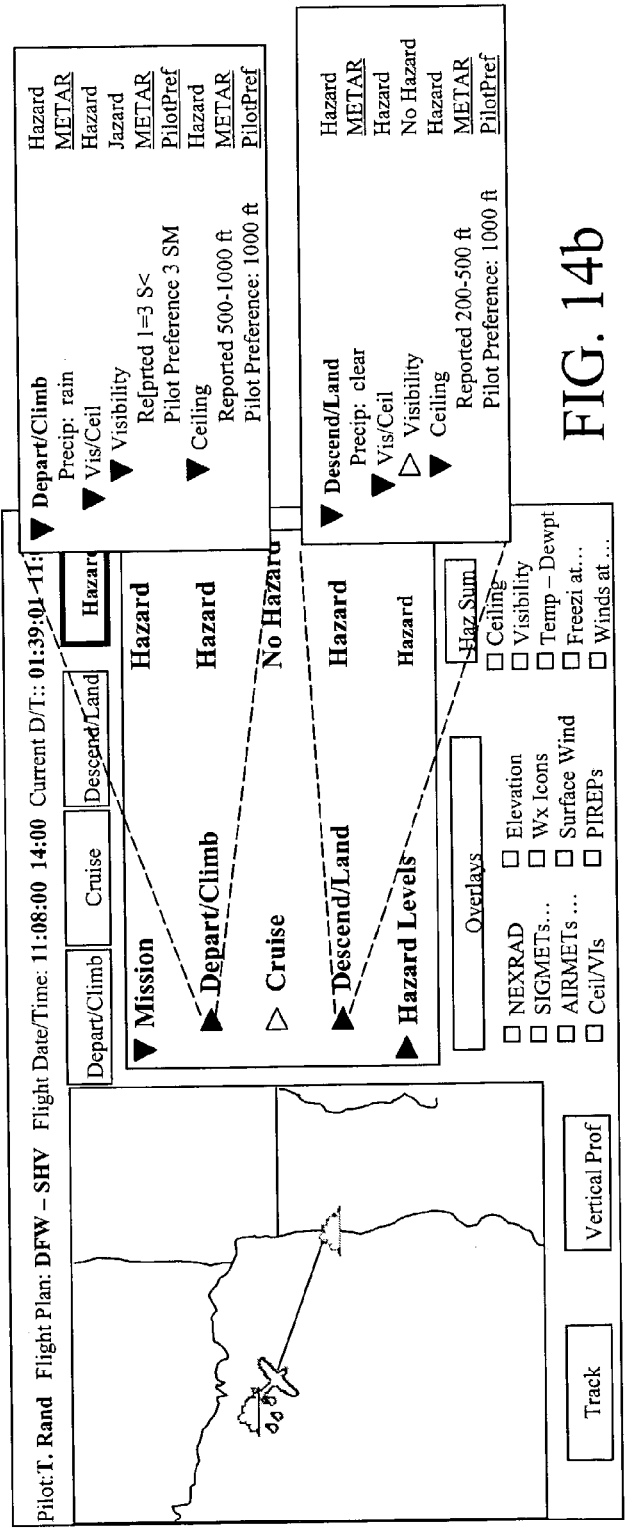
FIGS. 14a and 14b are a table of typical wrapper parameters and an exemplary display for a Preflight application.

The first AWARE application, AWARE Preflight, was implemented as a preflight Web-based presentation of weather and hazard alerts for general aviation pilots. The Bayesian network model acquires the appropriate mode-based user preferences 122 from visual, instrument or limited instrument flight mode tables as shown in FIG. 14a. In this original application, the user can peruse past or current weather sources. As shown in FIG. 14b, AWARE Preflight provides a presentation 124 of graphical and textual displays, augmented by the context-sensitive hazard analysis for each leg of a flight plan.

The hazard analysis is tailored to the specific pilot's preferences for visibility, ceiling, thunderstorm proximity and other parameters, as well as the aircraft type, and the specific flight path including a corridor around the path. The display, as shown in FIG. 14b, includes an analysis of hazards specific to the pilot's preferences and aircraft along the takeoff, cruise, and landing phases of the planned flight. As indicated, the pilot can drill down through the hazard assessment information to the actual text of the weather data report, preserving the integrity of the raw data.

Figures 15A, 15B:
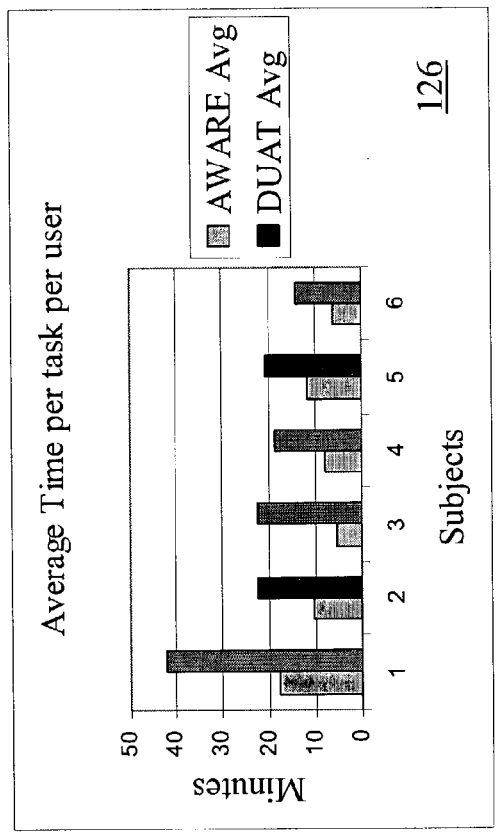
FIGS. 15a through 15c compare the effectiveness of DUAT text data with the AWARE system of the present invention for a preflight application.
Figure 15C:
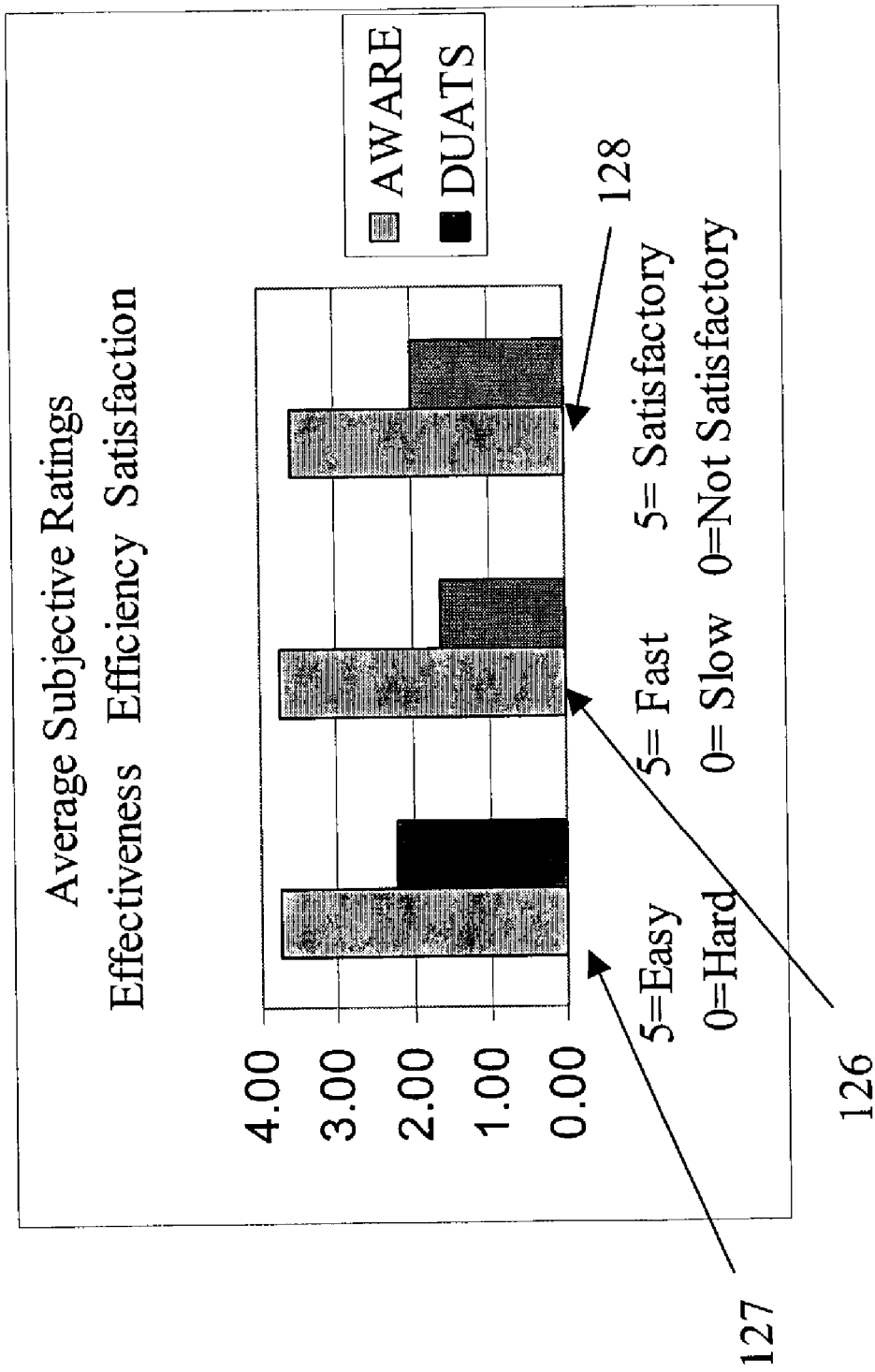

In the AWARE Preflight project, full usability testing was completed for both visual (VFR) and instrument-based (IFR) modes of the project. As shown in FIGS. 15a–15c, three measures were evaluated in the analysis: efficiency 126, effectiveness 127, and satisfaction 128 of using AWARE and using currently available text-based data (DUAT). Simple statistical analysis was performed on data acquired both by timing and from evaluation forms.

Both VFR and IFR tests showed that AWARE provided faster and more effective weather evaluation; all subjects graded AWARE higher for effectiveness, efficiency, and usability. In general, AWARE Preflight supported subjects more effectively finding more complex details, especially cumulative for all phases of the flights and for interacting parameters. By the subjects' final evaluation, AWARE also provided a higher level of analysis than in either text or web-based evaluations; it approximated that of a human weather briefer.

In-Cockpit

Figure 16B:
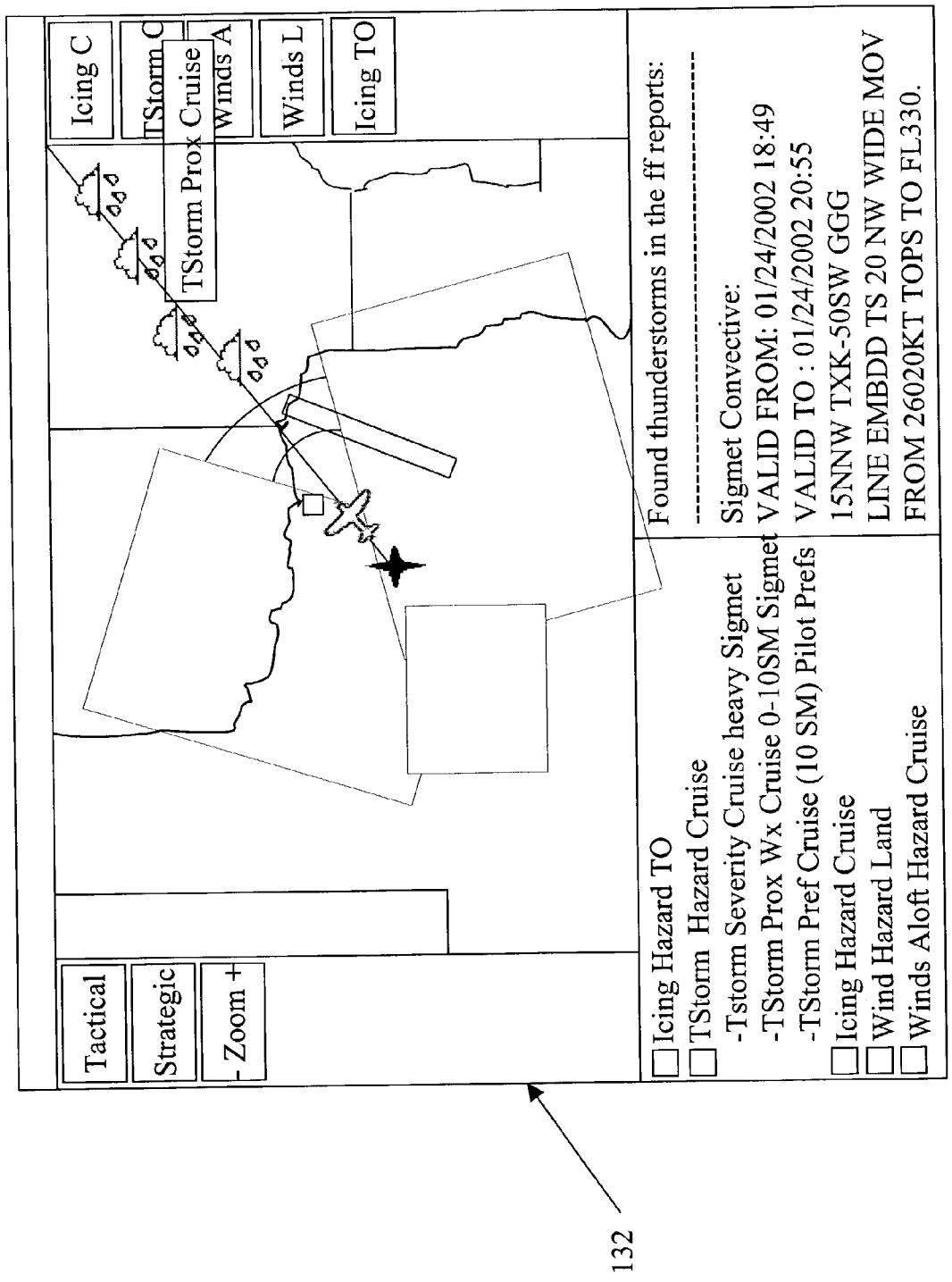

The second application, AWARE In-Cockpit, is again focused on one pilot's flight plan, but is different from AWARE Preflight in that it implements the weather hazard alerting system real-time in-cockpit. In limited instrument flight mode, the Bayesian network wrapper 130 shown in FIG. 16a eliminates visibility and endurance checks en-route for real-time mode, and the database timeframes are limited to access only current weather sources. Weather sources include those available in AWARE Preflight. A screen shot 132 of AWARE In-Cockpit is shown in FIG. 16b with hazard alerts displayed on the right and text details of hazard assessment/weather source shown at the bottom.

Figure 17B:
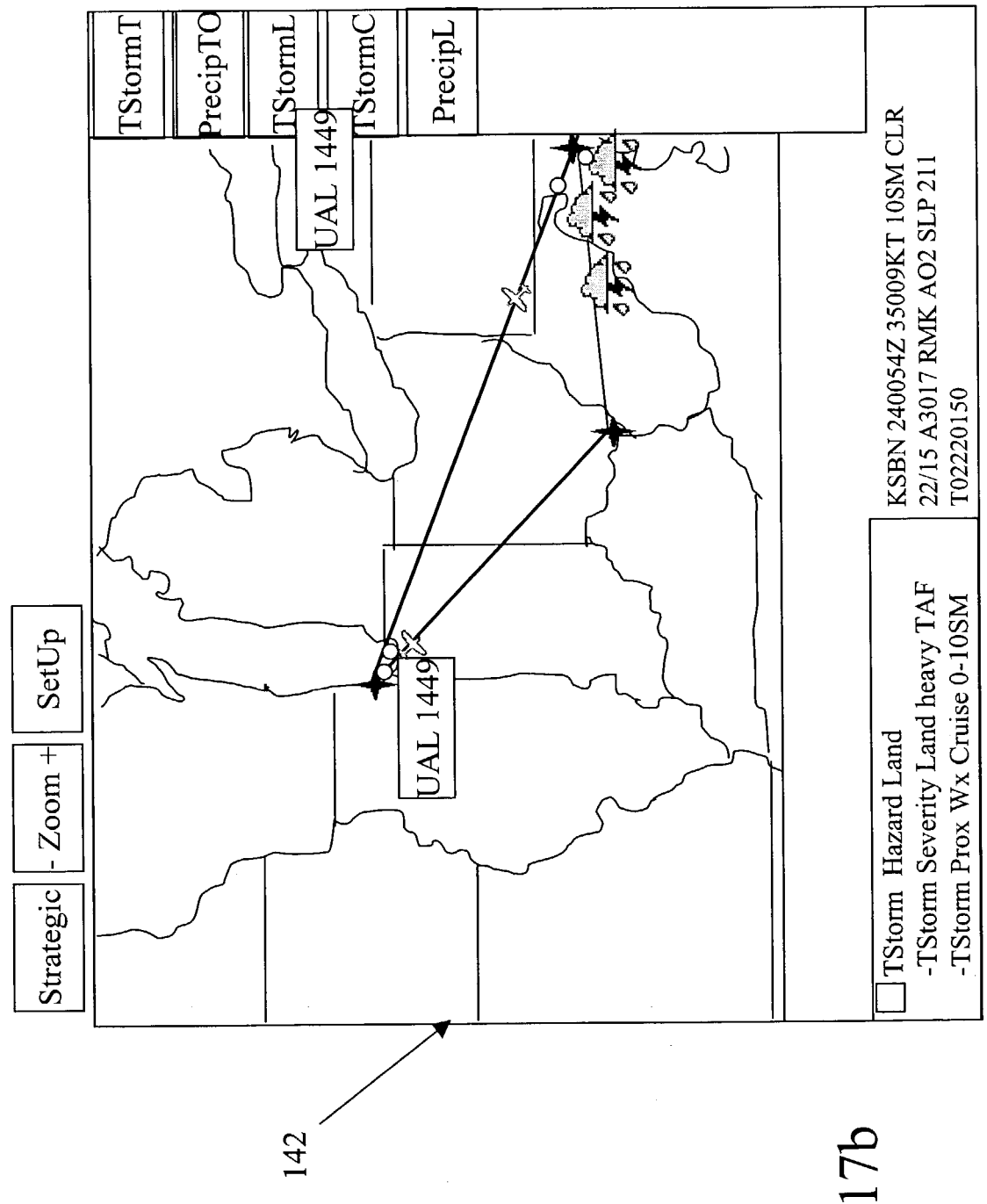

The hierarchy of hazard analysis is organized by distance from the current aircraft position; the model is executed each time additional weather sources are received, currently at a cycle of every 5 minutes, to dynamically present the hazards currently associated with the flight plan. In iterative prototyping mode, we worked with pilots at a commercial flight operations center, initially to determine their response to AWARE Preflight concepts and then to prototypes we designed specifically for in-cockpit use. It was determined that many of the AWARE Preflight visualization overlays could be of value in-cockpit, and alerts based on the pilot's preferences and on real-time weather sources Controller Commercial controllers, also known as dispatchers, are responsible for alerting pilots on multiple flights of weather hazards. Consequently, AWARE Controller extends AWARE In-Cockpit by presenting multiple flight paths. Again, the presentation of hazard alerts is based on the unified BN model. In this case, it is instantiated uniquely for each flight plan in order to compute flight-specific alerts, with preferences being controller-based. Parameters passed to a BN Wrapper 140 as shown in FIG. 17*a* control each BN model instantiation. The strategic display 142 shown in FIG. 17*b* is similar to prior applications with the same overlays available. For alert buttons, mouse-over provides details for both the hazard and the relevant flights. Mouse-over capability provides a short textual feedback on-screen when the mouse hovers over an item, after a short period of time.

Extensive experimentation with controllers at three flight operations centers was conducted to determine the relevance of hazard alerts for multiple flights, and to determine their response to designs for AWARE Controller. AWARE Controller was implemented to represent multiple flights per controller, with a separate Bayesian network model instantiated per flight. Alerts were specific to a flight, but if there were replicates among flights, they were grouped.

In summary, controllers want automated alerts for multiple flights, primarily for hazards they're not already trained to identify from visual data. These alerts may be based on additional data sources, single or multiple-parameter calculations, or requirements for alternate data, and the AWARE Controller system provides such alerts.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An Aviation Weather Awareness and Reporting Enhancements (AWARE) system, comprising:
   a database configured to store text and graphic weather data and to store context information including at least one of pilot preferences, aircraft properties and airport properties;
   a server that extracts temporally-spatially filtered weather data and context information from the database and uses a Bayesian network (BN) to assess the weather data and context information and issue hazard alerts; and
   a client that receives user requests, issues client requests to the server to extract the weather data and context information and displays the filtered weather data and hazard alerts.

2. The AWARE system of claim 1, wherein the Bayesian network is defined as a tuple (V,E,P), where V is a set of nodes, E is a set of edges and P is a set of conditional probability distributions, said set of nodes V comprising at least one hazard node that is used to compute a hazard alert, said hazard node having at least one parent evidence node that represents weather data or context information.

3. The AWARE system of claim 2, wherein the server further comprises a BN wrapper that instantiates, in the BN, at least one evidence node with the filtered weather data and/or the relevant context data and executes an algorithm to compute marginal distributions over the hazard nodes, which are compared to at least one threshold and, if applicable, declared hazard alerts.

4. The AWARE system of claim 3, wherein the evidence node comprises a weather data source node and a context node.

5. The AWARE system of claim 4, wherein the wrapper extracts actual context information from the database to instantiate the context node.

6. The AWARE system of claim 4, wherein the context node has a default value.

7. The AWARE system of claim 6, wherein the default value is probabilistic.

8. The AWARE system of claim 4, wherein the wrapper extracts actual weather data from the database to instantiate the weather data source node.

9. The AWARE system of claim 4, wherein the weather data source node has probabilistic value.

10. The AWARE system of claim 3, wherein the database stores pilot preferences including at least one of qualifications, ratings and weather preferences, aircraft properties including at least one of make, fuel capacity, range, cruise speed and takeoff and landing distances and airport properties including at least one of identification, runway length, surface conditions, lighting and runway open/closed.

11. The AWARE system of claim 3, wherein the set of nodes V includes a plurality of first tier hazard nodes whose marginal distributions and hazard alert status are determined by the conditional probability distributions P and a plurality of said parent evidence nodes, said plurality of first tier hazard nodes and their marginal distributions being the parent nodes for at least one second tier hazard node, said wrapper executing the algorithm to compute a marginal distribution over the second tier hazard node, which is compared to at least one threshold and, if applicable, declared the hazard alert.

12. The AWARE system of claim 11, wherein the first tier hazard nodes are assigned respective utilities based on a severity measure that compares weather data to context information, said algorithm computing a utility-based measure of hazard by weighting the marginal distributions with said utilities.

13. The AWARE system of claim 11, wherein said first and second tier hazard nodes are assigned respective utilities based on a criticality measure of the hazard node, said algorithm computing a utility-based measure of hazard by weighting the marginal distributions with said utilities.

14. The AWARE system of claim 3, wherein said set of nodes V comprises a Mission Hazard node.

15. The AWARE system of claim 14, wherein said Mission Hazard node has parents hazard nodes Depart/Climb Hazard, Cruise Hazard and Descend/Land Hazard.

16. The AWARE system of claim 15, wherein said Depart/Climb hazard node has at least one parent hazard node selected from Visibility/Ceiling Hazard Takeoff (TO), Wind Hazard TO, Runway Hazard TO, Precipitation Hazard TO and Other Overall Weather Hazard TO, which in turn have at least one parent evidence node.

17. The AWARE system of claim 15, wherein said Cruise hazard node has at least one parent hazard node selected from Visibility/Ceiling Hazard Cruise (C), Winds Aloft Hazard C, Endurance Hazard C and Other Overall Weather Hazard C, which in turn have at least one parent evidence node.

18. The AWARE system of claim 15, wherein said Descend/Land hazard node has at least one parent hazard node selected from Visibility/Ceiling Hazard Land (L), Wind Hazard L, Precipitation Hazard L and Other Overall Weather Hazard L, which in turn have at least one parent evidence node.

19. The AWARE system of claim 3, wherein the server comprises a text and graphics postprocessor (TGP) that integrates the filtered weather data for display by the client.

20. The AWARE system of claim 19, wherein the TGP contextually filters the T/S filtered weather data, said contextual filter being either hard-coded or accessed from the context information in the database.

21. The AWARE system of claim 19, wherein the T/S filtered weather data extracted from the database and returned to the Bayesian network and the TGP cover different spatial regions.

22. The AWARE system of claim 21, wherein the T/S filtered weather data returned to the postprocessor is buffered to encompass a wider region than the filtered weather data returned to the Bayesian network.

23. The AWARE system of claim 19, wherein the TGP identifies events in the weather text data and specifies icon identifiers to those events that are registered to the weather graphic data.

24. The AWARE system of claim 3, wherein the client displays the filtered graphic weather data, a portion of the filtered text weather data, hazard alerts and hazard assessment information in different frames.

25. The AWARE system of claim 24, wherein the portion of the filtered text weather data and the hazard assessment information are keyed to either the selection of a hazard alert or proximity of the aircraft to the hazard.

26. The AWARE system of claim 25, wherein the display portion includes the raw text weather data from the database that contributed to the declaration of the alert.

27. The AWARE system of claim 26, wherein the hazard assessment information comprises a summary of the parent evidence nodes and the marginal distribution of the hazard node.

28. The AWARE system of claim 27, wherein the client allows a user to drill-down into the hazard assessment information or text weather data to access additional detail.

29. The AWARE system of claim 24, wherein the client overlays graphic icons assigned to events in the weather text data on the graphic weather data.

30. The AWARE system of claim 24, wherein the client is configured to receive user requests to enter or update pilot, aircraft or airport context information into the database or to override stored context information.

31. The AWARE system of claim 24, wherein the marginal distribution is compared to a plurality of thresholds associated with different alert states and the hazard alert associated with the highest exceeded threshold is declared, said client displaying the hazard alerts associated with the different alert states in different colors.

32. The AWARE system of claim 24, wherein the set of nodes V includes a plurality of hazard nodes organized in a graph structure in which the evidence nodes are the parents to the lowest tier hazard nodes in the tree, which are in turn the parents to the next tier of hazard nodes, said client displaying alerts for all the hazard nodes that declare alerts in the graph.

33. The AWARE system of claim 24, wherein the set of nodes V includes a plurality of hazard nodes organized in a graph structure in which the evidence nodes are the parents to the lowest tier hazard nodes in the tree, which are in turn the parents to the next tier of hazard nodes, said client displaying alerts for the lowest hazard nodes in a branch of declared alerts in the graph.

34. The AWARE system of claim 3, wherein essentially the same Bayesian network and contextual information is used for preflight, in-cockpit and controller applications.

35. The AWARE system of claim 34, wherein the preflight application uses both past and current weather data sources and displays weather data and hazard alerts for the depart/climb, cruise and descend/land legs of a flight.

36. The AWARE system of claim 34, wherein the in-cockpit application uses only current weather data sources and displays weather data and hazard alerts only for the current leg of a flight.

37. The AWARE system of claim 34, wherein the controller application displays weather data and hazard alerts for multiple flights, each flight having its own Bayesian network.

38. The AWARE system of claim 37, wherein the client selectively groups hazard alerts from one or more flights.

39. An Aviation Weather Awareness and Reporting Enhancements (AWARE) system, comprising:
   a temporal-spatial (T/S) database that stores the text and graphic weather data, and
   a contextual-information database comprising data selected from at least one of pilot preferences, aircraft properties and airport properties; and
   a Bayesian network (BN) defined as a tuple (V,E,P), where V is a set of nodes, E is a set of edges and P is a set of conditional probability distributions, said set of nodes V comprising at least one hazard node whose state determines a hazard alert, said hazard node having at least one parent data node that is instantiated with weather data from the T/S database and at least one parent context node that is instantiated with preferences or properties from the contextual-information databases.

40. The AWARE system of claim 39, wherein the set of nodes V includes a plurality of first tier hazard nodes whose marginal distributions and hazard alert status are determined by the conditional probability distributions P and a plurality of said parent data and context nodes, said plurality of first tier hazard nodes and their marginal distributions being the parent nodes for at least one second tier hazard node, said wrapper executing the algorithm to compute a marginal distribution over the second tier hazard node, which is compared to at least one threshold and, if applicable, declared the hazard alert.

41. The AWARE system of claim 40, wherein the first tier hazard nodes are assigned respective utilities based on a severity measure that compares weather data to preferences or properties, said algorithm computing a utility-based measure of hazard by weighting the marginal distributions with said utilities.

42. The AWARE system of claim 40, wherein said first and second tier hazard nodes are assigned respective utilities based on a criticality measure of the hazard node, said algorithm computing a utility-based measure of hazard by weighting the marginal distributions with said utilities.

43. The AWARE system of claim 39, wherein essentially the same Bayesian network and contextual information database is used for preflight, in-cockpit and controller applications.

44. An Aviation Weather Awareness and Reporting Enhancements (AWARE) system, comprising:
- a temporal-spatial (T/S) database that stores the text and graphic weather data,
- a contextual-information database comprising data selected from at least one of pilot preferences, aircraft properties and airport properties
- a text and graphics postprocessor (TGP) that integrates filtered text and graphic weather data extracted from the T/S database, said TGP identifying events in the weather text data and assigning icons to those events that are registered to the weather graphic data,
- a Bayesian network (BN) defined as a tuple (V,E,P), where V is a set of nodes, E is a set of edges and P is a set of conditional probability distributions, that assesses the filtered text and graphic weather data in the context of preferences and properties from the contextual-information database to declare hazard alerts and provide hazard assessment information, and
- a client that displays the filtered graphic weather data, the overlaid icons and hazard alerts and, for a selected hazard alert, displays the relevant text weather data and hazard assessment information.

45. The AWARE system of claim 44, wherein the relevant text weather data includes the text weather data from the database that contributed to the declaration of the alert.

46. The AWARE system of claim 44, wherein the hazard assessment information comprises a summary of the parent evidence nodes and the marginal distribution of the hazard node.

47. The AWARE system of claim 44, wherein the client allows a user to drill-down into the hazard assessment information or text weather data to access lower nodes in the Bayesian network.

48. The AWARE system of claim 44, wherein a marginal distribution is calculated for each hazard node and compared to a plurality of thresholds associated with different alert states and the hazard alert associated with the highest exceeded threshold is declared, said client displaying the hazard alerts associated with the different alert states in different colors.

49. The AWARE system of claim 44, wherein the set of nodes V includes a plurality of hazard nodes organized in a graph structure in which the evidence nodes are the parents to the lowest tier hazard nodes in the tree, which are in turn the parents to the next tier of hazard nodes, said client displaying alerts for all the hazard nodes that declare alerts in the graph.

50. The AWARE system of claim 44, wherein the set of nodes V includes a plurality of hazard nodes organized in a graph structure in which the evidence nodes are the parents to the lowest tier hazard nodes in the tree, which are in turn the parents to the next tier of hazard nodes, said client displaying alerts for the lowest hazard nodes in a branch of declared alerts in the graph.

51. An Aviation Weather Awareness and Reporting Enhancements (AWARE) system, comprising:
- An AWARE client configured to receiver user requests, issue client requests and display weather data and hazard alerts;
- an AWARE database comprising;
  - a temporal-spatial (T/S) database that stores the text and graphic weather data, and
  - a contextual-information database comprising data selected from at least one of pilot preferences, aircraft properties and airport properties;
- an AWARE server comprising;
  - a query formulator that issues queries to extract filtered weather data from the T/S database in response to client requests,
  - a text and graphics postprocessor (TGP) that integrates the filtered text and graphic weather data and forwards it to the AWARE client, and
  - a decision support system (DSS) including a Bayesian network (BN) defined as a tuple (V,E,P), where V is a set of nodes, E is a set of edges and P is a set of conditional probability distributions, said set of nodes V being organized in a graph structure in which evidence nodes are the parents to first tier hazard nodes, which are in turn the parents to second tier hazard nodes, said evidence nodes being instantiated with the filtered weather data and relevant preferences and properties from the contextual-information database to determine the state of said first tier hazard nodes, which in turn determine the state of said second tier hazard nodes, the state of said hazard nodes determining the hazard alerts displayed by the client.

52. The AWARE system of claim 51, wherein the DSS executes an algorithm to compute marginal distributions over the hazard nodes, compares the marginal distributions to at least one threshold to determine the state and declares, if applicable, hazard alerts.

53. The AWARE system of claim 51, wherein the evidence node comprises a weather data source node and a context node.

54. The AWARE system of claim 51, wherein the first tier hazard nodes are assigned respective utilities based on a severity measure that compares weather data to context information, said algorithm computing a utility-based measure of hazard by weighting the marginal distributions with said utilities.

55. The AWARE system of claim 51, wherein said first and second tier hazard nodes are assigned respective utilities based on a criticality measure of the hazard node, said algorithm computing a utility-based measure of hazard by weighting the marginal distributions with said utilities.

56. The AWARE system of claim 51, wherein said set of nodes V comprises a Mission Hazard node, which has parents hazard nodes Depart/Climb Hazard, Cruise Hazard and Descend/Land Hazard.

57. The AWARE system of claim 51, wherein the client displays a portion of the filtered text weather data and hazard assessment information that are keyed to user selection of a particular hazard alert.

58. A method of providing Aviation Weather Awareness and Reporting Enhancements (AWARE), comprising:
- Storing text and graphic weather data;
- Storing contextual-information including at least one of pilot preferences, aircraft properties and airport properties;
- Temporally and spatially filtering the text and graphic weather data;
- Displaying the filtered text and graphic weather data;
- Retrieving relevant preferences and properties to the filtered weather data;
- Using a Bayesian network to assess the filtered text and graphic weather data in the context of the relevant preferences and properties and issue hazard alerts; and
- Displaying the hazard alerts.

59. The method of claim 58, the text and graphic weather data is temporally and spatially filtered in response to a user generated request.

60. The method of claim 59, wherein the user is a pilot or a controller using AWARE in one of a preflight, in-cockpit or controller application.

61. The method of claim 58, wherein the Bayesian network defined as a tuple (V,E,P), where V is a set of nodes organized in a graph structure in which data source nodes and context nodes are parents to first tier hazard nodes, which are in turn parents to second tier hazard nodes, E is a set of edges and P is a set of conditional probability distributions, said Bayesian network assessing the weather data by;
  a) Instantiating the data source nodes with filtered text and graphic weather data;
  b) Instantiating the context nodes with relevant preferences and properties;
  c) Computing marginal distributions over the first tier hazard nodes;
  d) Comparing the marginal distributions to at least one threshold;
  e) Declaring a hazard alert for those hazard nodes whose marginal distributions exceed the threshold; and
  f) Repeating steps c through e for the second tier hazard nodes.

62. The method of claim 61, further comprising the steps of;
  assigning a utility to each first tier hazard node based on a severity measure that compares the weather data to the preferences or properties;
  computing a utility-based measure of hazard by weighting the marginal distributions with the utilities; and
  comparing the utility-based measure to at least one threshold to declare the hazard alerts.

63. The method of claim 61, further comprising the steps of;
  assigning a utility to each first tier hazard node based on a criticality measure of the hazard node;
  computing a utility-based measure of hazard by weighting the marginal distributions with the utilities; and
  comparing the utility-based measure to at least one threshold to declare the hazard alerts.

64. The method of claim 58, wherein temporally-spatially filtered text and weather data that is displayed is buffered to encompass a wider region than the temporally-spatially filtered text and weather that is provided to the Bayesian network.

65. The method of claim 58, further comprising the step of identifying events in the weather text data, assigning icons to those events that are registered to the graphic weather data, and displaying the icons on the graphic weather data.

66. The method of claim 58, wherein hazard assessment information from the Bayesian network and a portion of the filtered text weather data are displayed and keyed to either a selection of a particular hazard alert or proximity of the aircraft to the hazard.

67. The method of claim 66, further comprising a capability to drill-down into the hazard assessment information or text weather data to access additional detail.

\* \* \* \* \*